United States Patent
Limberg et al.

(10) Patent No.: US 6,300,984 B1
(45) Date of Patent: Oct. 9, 2001

(54) GHOST-CANCELLATION REFERENCE SIGNALS USING SPACED PN SEQUENCES

(75) Inventors: Allen LeRoy Limberg, Vienna, VA (US); Chandrakant B. Patel, Hopewell, NJ (US)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/217,631

(22) Filed: Dec. 22, 1998

Related U.S. Application Data

(60) Provisional application No. 60/071,288, filed on Jan. 13, 1998.

(51) Int. Cl.[7] .................................................. H04N 5/21
(52) U.S. Cl. ........................... 348/614; 348/608; 375/348; 375/350
(58) Field of Search .................................. 348/614, 607, 348/470, 725, 726, 608, 914; 375/348, 350, 232, 346, 349

(56) References Cited

U.S. PATENT DOCUMENTS

| | | | | |
|---|---|---|---|---|
| 5,282,154 | * | 1/1994 | Knutson et al. | 364/724.16 |
| 5,335,009 | * | 8/1994 | Sun et al. | 348/614 |
| 5,440,347 | * | 8/1995 | Guan | 348/466 |
| 5,526,378 | * | 6/1996 | Knutson et al. | 375/229 |
| 5,619,269 | * | 4/1997 | Lee | 348/432 |
| 5,654,766 | * | 8/1997 | McNay | 348/614 |

* cited by examiner

Primary Examiner—Victor R. Kostak
(74) Attorney, Agent, or Firm—Sughrue, Mion, Zinn, Macpeak & Seas, PLLC

(57) ABSTRACT

Training signal for channel equalization is located in the initial data segment of each DTV data field or in the nineteenth scan line of each NTSC field. The training signal comprises a pseudo-random noise sequence near the conclusion of the initial data segment of each DTV data field or the nineteenth scan line of each NTSC field and an earlier pseudo-random noise sequence. The later pseudo-random noise sequence is used in a television receiver for detecting pre-ghosts and the earlier pseudo-random noise sequence is used in a television receiver for detecting post-ghosts.

21 Claims, 9 Drawing Sheets

GHOST-CANCELLATION REFERENCE SIGNALS USING SPACED PN SEQUENCES

This application is filed under 35 U.S.C. 111(a) claiming pursuant to 35 U.S.C. 119(e)(1) benefit of the filing date of provisional application serial No. 60/071,288 filed Jan. 13, 1998, pursuant to 35 U.S.C. 111(b).

The invention relates to ghost-cancellation circuitry in television receivers and to reference signals included in transmitted television signals for facilitating such ghost-cancellation.

BACKGROUND OF THE INVENTION

The visual effects of multipath distortion upon analog television signals can be broadly classified in two categories: multiple images and distortion of the frequency response characteristic of the channel. Both effects occur due to the time and amplitude variations among the multipath signals arriving at the reception site. When the relative delays of the multipath signals with respect to the reference signal are sufficiently large, the visual effect is observed as multiple copies of the same image on the television display displaced horizontally from each other. These copies are sometimes referred to as "macroghosts" to distinguish them from "microghosts", which will be presently described. Macroghosts are more common in over-the-air terrestrial broadcasts than in cablecasting. Long-delay multipath effects, or macroghosts, are typically reduced by cancellation schemes.

In the usual case in which the direct signal predominates and the receiver is synchronized to the direct signal, the ghost images are displaced to the right at varying position, intensity and polarity. These are known as trailing ghosts or "post-ghost" images. Typically, the range for post-ghosts extends to 40 microseconds displacement from the "principal" signal, with 70% or so of post-ghosts occurring in a sub-range that extends to 10 microseconds displacement.

In the less frequently encountered case where the receiver synchronizes to a reflected signal, there will be one or more ghost images displaced to the left of the reference image. These are known as leading ghosts or "pre-ghost" images. Pre-ghosts occurring in off-the-air reception can be displaced as much as 6 microseconds from the "principal" signal, but typically displacements are no more than 2 microseconds.

Multipath signals delayed relatively little with respect to the reference signal do not cause separately discernible copies of the predominant image, but do introduce distortion into the frequency response characteristic of the channel. The visual effect in this case is observed as increased or decreased sharpness of the image and in some cases loss of some image information. These short-delay, close-in or nearby ghosts are commonly caused by unterminated or incorrectly terminated radio-frequency transmission lines such as antenna lead-ins or cable television drop cables. In a cable television environment, it is possible to have multiple close-in ghosts caused by the reflections introduced by having several improperly terminated drop cables of varying lengths. Such multiple close-in ghosts are frequently referred to as "micro-ghosts", and they can accumulate to cause significant distortion. Short-delay multipath effects, or microghosts, are typically alleviated by waveform equalization, generally by peaking and/or group-delay compensation of the video frequency response. In September 1995the Advanced Television Systems Committee (ATSC) published a standard for digital high-definition television (HDTV) signals that has been accepted as the de facto standard for terrestrial broadcasting of digital television (DTV) signals in the United States of America. The standard will accommodate the transmission of DTV formats other than HDTV formats, such as the parallel transmission of four television signals having normal definition in comparison to an NTSC analog television signal. The standard uses vestigial-sideband (VSB) amplitude modulation (AM) to transmit the DTV signals, designed for transmission through 6-Mz-bandwidth ultra-high-frequency (UHF) channels that correspond to channels currently used for analog television transmission.

DTV transmitted by VSB AM during terrestrial broadcasting in the United States of America comprises a succession of consecutive-in-time data fields each containing 313 consecutive-in-time data segments or data lines. Each segment of data is preceded by a data segment synchronization (DSS) code group of four symbols having successive values of +S, −S, −S and +S. The value +S is one level below the maximum positive data excursion, and the value −S is one level above the maximum negative data excursion. The segments of data are each of 77.3 microsecond duration, and there are 832 symbols per data segment for a symbol rate of about 10.76 million bauds or symbols per second. The initial line of each data field is a data field synchronization (DFS) code group that codes a training signal for channel-equalization and multipath suppression procedures. The remaining lines of each data field contain data that have been Reed-Solomon forward error-correction coded. In over-the-air broadcasting the error-correction coded data are then trellis coded using twelve interleaved trellis codes, each a punctured ⅔ rate trellis code-with one uncoded bit. Trellis coding results are parsed into three-bit groups for over-the-air transmission in eight-level one-dimensional-constellation symbol coding, which transmission is made without symbol pre-coding separate from the trellis coding procedure. Trellis coding is not used in cablecasting proposed in the ATSC standard. The error-correction coded data are parsed into four-bit groups for transmission as sixteen-level one-dimensional-constellation symbol coding, which transmissions are made without preceding.

The carrier frequency of a VSB DTV signal is 310 kHz above the lower limit frequency of the TV channel. The VSB signals have their natural carrier wave, which would vary in amplitude depending on the percentage of modulation, suppressed. The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 3-bit symbol coding have normalized values of −7, −5, −3, −1, +1, +3, +5 and +7 in the carrier modulating signal exclusive of pilot carrier, the pilot carrier has a normalized value of 1.25. The normalized value of +S is +5, and the normalized value of −S is −5.

Ghosts are a problem in digital television (DTV) transmissions as well as in NTSC analog television transmissions, although the ghosts are not seen as such by the viewer of the image televised by DTV. Instead, the ghosts cause errors in the data-slicing procedures used to convert symbol coding to binary code groups. If these errors are too frequent in nature, the error correction capabilities of the DTV receiver are overwhelmed, and there is catastrophic failure in the television image. If such catastrophic failure occurs infrequently, it can be masked to some extent by freezing the last transmitted good TV images, such masking being less satisfactory if the TV images contain considerable motion content. The catastrophic failure in the television image is accompanied by loss of sound.

The training signal or ghost-cancellation reference (GCR) signal in the initial line of each data field of an ATSC-standard DTV signal is a 511-sample pseudo-random noise sequence (or "PN sequence") followed by three 63-sample PN sequences. A 511-sample PN sequence is referred to as a "PN511 sequence" and a 63-sample PN sequence is referred to as a "PN63 sequence". The middle ones of the 63-sample PN sequences in the field synchronization codes are transmitted in accordance with a first logic convention in the first line of each odd-numbered data field and in accordance with a second logic convention in the first line of each even-numbered data field, the first and second logic conventions being one's complementary respective to each other. This training signal has not worked well in practice, however, and cannot be incorporated in its entirety into an NTSC television signal.

The middle PN63 sequence of the ATSC field synchronization code, as separated by differentially combining corresponding samples of successive field synchronization code sequences, can be used as a basis for detecting ghosts. Pre-ghosts of up to 53.701 microseconds (4+511+63=578 symbol epochs) before the separated middle PN63 sequence can be detected in a discrete Fourier transform (DFT) procedure without have to discriminate against data in the last data segment of the preceding data field. However, the post-ghosts of such data can extend up to forty microseconds into the first data segments and add to the background clutter that has to be discriminated against when detecting pre-ghosts of the separated middle PN63 sequence. Post-ghosts of up to 17.746 microseconds (63+104+24=191 symbol epochs) after the separated middle PN63 sequence can be detected in a discrete Fourier transform (DFT) procedure without have to discriminate against data in the precode and in the data segment of the succeeding data field. Longer-delayed post-ghosts have to be detected while discriminating against background clutter that includes data. The autocorrelation properties of the PN63 sequence are not so great that detection of longer-delayed post-ghosts may be sufficiently sensitive. The middle PN63 sequence of the ATSC field synchronization code provides more pre-ghost canceling capability than required in practice, but insufficient post-ghost canceling capability. Post-ghosts delayed up to forty microseconds after principal signal occur in actual practice, with 70% or so of post-ghosts being no more than 10 microseconds later than the principal signal. However, pre-ghosts preceding the principal signal-by more than four microseconds are rare, according to page 3 of the T3S5 Report Ghost Canceling Reference Signals published Mar. 20, 1992 by the ATSC.

If one seeks to exploit the autocorrelation properties of the PN511 sequence in the ATSC DTV signal for selection of ghosts in a DFT procedure, the selection filter has to discriminate PN511 sequence and its ghosts from background clutter that includes data and the initial and final PN63 sequences. This background clutter has substantial energy, so weaker ghosts of the PN511 sequence are difficult to detect. The higher energy response of the PN511 autocorrelation filter used for ghost detection cannot be fully exploited because data and the initial and final PN63 sequences increase so much the energy of the background clutter that the filter is to discriminate against.

The current de facto standard for ghost-cancellation reference (GCR) signal in an analog television signal transmitted in accordance with the National Television System Committee (NTSC) standard is as follows. A Bessel chirp is transmitted in the nineteenth vertical-blanking-interval (VBI) horizontal scan line of each field. This Bessel chirp is transmitted in specified polarities over a cycle of four fields facilitating its accumulation over one or more such cycles in the receiver for recovering a ghosted Bessel chirp signal on which to base calculation of the transmission channel characterization. The cost of ghost-cancellation circuitry is quite high, somewhat over $200 in the retail price of a receiver, so few analog TV receivers with ghost-cancellation circuitry have been commercially manufactured. The inventors believe that television receivers capable of receiving either DTV or NTSC signals, referred to in this document as "NTSC/DTV receivers", will be the norm during a period of transition from NTSC TV broadcasting to DTV broadcasting. Ghost-cancellation and equalization circuitry is a practical necessity in the DTV portion of the TV receiver. Accordingly, the inventors point out, it can be economical to use at least part of that same ghost-cancellation and equalization circuitry to suppress ghosts in the NTSC portion of the TV receiver. Since viewers will be become accustomed to high resolution ghost-free pictures during DTV reception, they are apt to want better-resolution ghost-free pictures during NTSC reception as well, so ghost cancellation and channel equalization during NTSC reception may become a stronger consideration when purchasing a television receiver.

This dual usage of the same ghost-cancellation and equalization circuitry is furthered by the nineteenth VBI scan line of each field including a GCR signal similar to that used in the DTV signal rather than the Bessel chirp that is the current standard. The use of a similar GCR signal during DTV transmission and during NTSC transmission, rather than using different GCR signals, expedites using the same microcomputer program to calculate weighting coefficients for the ghost-cancellation and equalization filters during the reception of each type of transmission. The desirability of using a similar GCR signal during DTV transmission and during NTSC transmission, in order to reduce hardware in an NTSC/DTV receiver, has not been previously recognized, insofar as the inventors are aware.

The inventors observe that the $10.76 \cdot 10^6$ baud rate of DTV using the ATSC standard and the 3.58 MHz color subcarrier frequency of NTSC TV have harmonics that are close in frequency, facilitating the construction of a sampling clock generator for the digital filtering used in the ghost-cancellation and equalization circuitry, which sampling clock generator is susceptible of receiving automatic frequency and phase control (AFPC) signal either from the 3.58 MHz color subcarrier frequency regenerated during NTSC TV reception or from the baud rate information extracted during DTV reception.

The inventors further observe that a ghost-cancellation signal of short enough duration to fit within the trace portion of an NTSC horizontal scan line will fit within the 828-symbol-duration in a data segment that follows the initial 4-symbol-duration data line synchronizing code. The inventors point out that the use of a similar GCR signal during DTV transmission and during NTSC transmission, rather than using different GCR signals, expedites using the same microcomputer program to calculate weighting coefficients for the same ghost-cancellation and equalization filters used during the reception of each type of transmission. The desirability of using a similar GCR signal during DTV transmission and during NTSC transmission, in order to reduce hardware in an NTSC/DTV receiver, has not been previously recognized, insofar as the inventors are aware.

A conventional approach in regard to utilizing GCR signals is to place the GCR signals in respective ones of regularly recurring uniform-duration segments of the television signal free from non-repetitive information and the ghosts of that non-repetitive information, corresponding samples of which segments of the television signal can be linearly combined for separating the GCR signals and their ghosts from repetitive information and the ghosts of that repetitive information. The separated GCR signal is disposed within the segment so that none of its pre-ghosts with substantial energy occur before the start of the segment and so that none of its post-ghosts with substantial energy occur after the finish of the segment. A correlation filter searching for ghosts of the GCR signal will accordingly not have to discriminate against high-energy components unrelated to the GCR signal. In ATSC signals the data segment of 832-symbol-interval duration, which data segment contains the GCR signals used as field synchronization codes, has only 820 contiguous symbol intervals free from non-repetitive information, since the last 12 symbol intervals repeat the final 12 symbols from the preceding data field. This means that each of the regularly recurring segments of the television signal free from non-repetitive information and the ghosts of that non-repetitive information has a duration of only 76.185 microseconds. In order to suppress pre-ghosts preceding "principal" signal up to 30 microseconds and post-ghosts succeeding "principal" signal up to 40 microseconds, while at the same time avoiding the correlation filter searching for ghosts of the GCR signal having to discriminate against high-energy components unrelated to the GCR signal, the GCR signal must have only about 6 microseconds duration presuming it to be optimally placed about 469 symbol intervals into data segments. If the GCR signal is a PN sequence with transitions occurring at symbol boundaries, the longest possible PN sequence is 63 symbols long. A simple PN63 GCR signal has less energy than one might like if trying to locate low-energy ghosts during conditions of noisy reception or co-channel interference. This is especially true when trying to locate and suppress low-energy ghosts during NTSC reception, as discernible from the ATSC T3S5 Report "Ghost Canceling Reference Signals".

The duration of an NTSC scan line is equivalent to 684 ATSC symbol intervals, and the duration of each horizontal sync pulse and its porches is equivalent to 113 ATSC symbol intervals. During NTSC reception, if the horizontal scan lines containing GCR signal are flanked by horizontal scan lines containing non-repetitive information, only a 74 microsecond period equivalent to 797 ATSC symbol intervals will be free from non-repetitive information to facilitate de-ghosting. In order to suppress pre-ghosts preceding "principal' signal up to 30 microseconds and post-ghosts succeeding "principal' signal up to 40 microseconds, while at the same time avoiding the correlation filter searching for ghosts of the GCR signal having to discriminate against high-energy components unrelated to the GCR signal, the GCR signal must be of only 4 microseconds duration or so. If the GCR signal is a PN sequence with transitions occurring at symbol boundaries, the longest possible PN sequence is 31 symbols long. A simple PN31 GCR signal definitely has less energy than one would like if trying to locate low-energy ghosts during conditions of noisy reception or co-channel interference.

While one could simply lengthen the PN sequence used as a GCR signal and suffer the consequences of reduction in the capability of suppressing pre-ghosts and/or post-ghosts with large displacement from "principal" signal, it is desirable to be able to lengthen the PN sequence used as a GCR signal to permit increase in its energy while maintaining the capability of suppressing weak pre-ghosts up to 30 microseconds earlier than "principal" signal and of suppressing weak post-ghosts up to 40 microseconds later than "principal" signal.

SUMMARY OF THE INVENTION

An aspect of the invention is embodied in an electrical signal received by a television signal receiver, which is of a type for receiving digital television signals and has adaptive channel equalization and ghost cancellation filter circuitry that can be trained responsive to composite ghost cancellation reference signals. The electrical signal is divided into segments having respective initial synchronizing signal portions. The segments are grouped into fields. Most of the segments of each field are available for transmitting television information, with at least one reference-signal segment of each field transmitting one of the composite ghost cancellation reference signals in a final portion thereof. Each reference-signal segment includes a respective first pseudo-random noise sequence at the beginning of the final portion thereof followed after an intervening time interval by a respective second pseudo-random noise sequence near the finish of that final portion thereof. The composite ghost cancellation reference signal transmitted in each reference-signal segment comprises the respective first and second pseudo-random noise sequences, which preferably are orthogonal to each other.

Preferably, the first and second pseudo-random noise sequences appear in different polarities in different fields. This facilitates first and second pseudo-random noise sequences being separated from each other by the television signal receiver algebraically combining elements of each reference-signal segment with corresponding elements of at least one other reference-signal segment from another field.

Another aspect of the invention is the use of similar component ghost-cancellation reference signals as field synchronization signals in the initial data segments of each data field of a digital television (DTV) signal as are used in a selected ($9^{th}$) vertical-blanking-interval (VBI) horizontal scan line of an analog television signal. This aspect of the invention is facilitated by each GCR signal comprising a first, preceding component used in the detection of post-ghosts followed after an intervening time interval by a second, succeeding component used in the detection of pre-ghosts.

DETAILED DESCRIPTION

Figure 1:
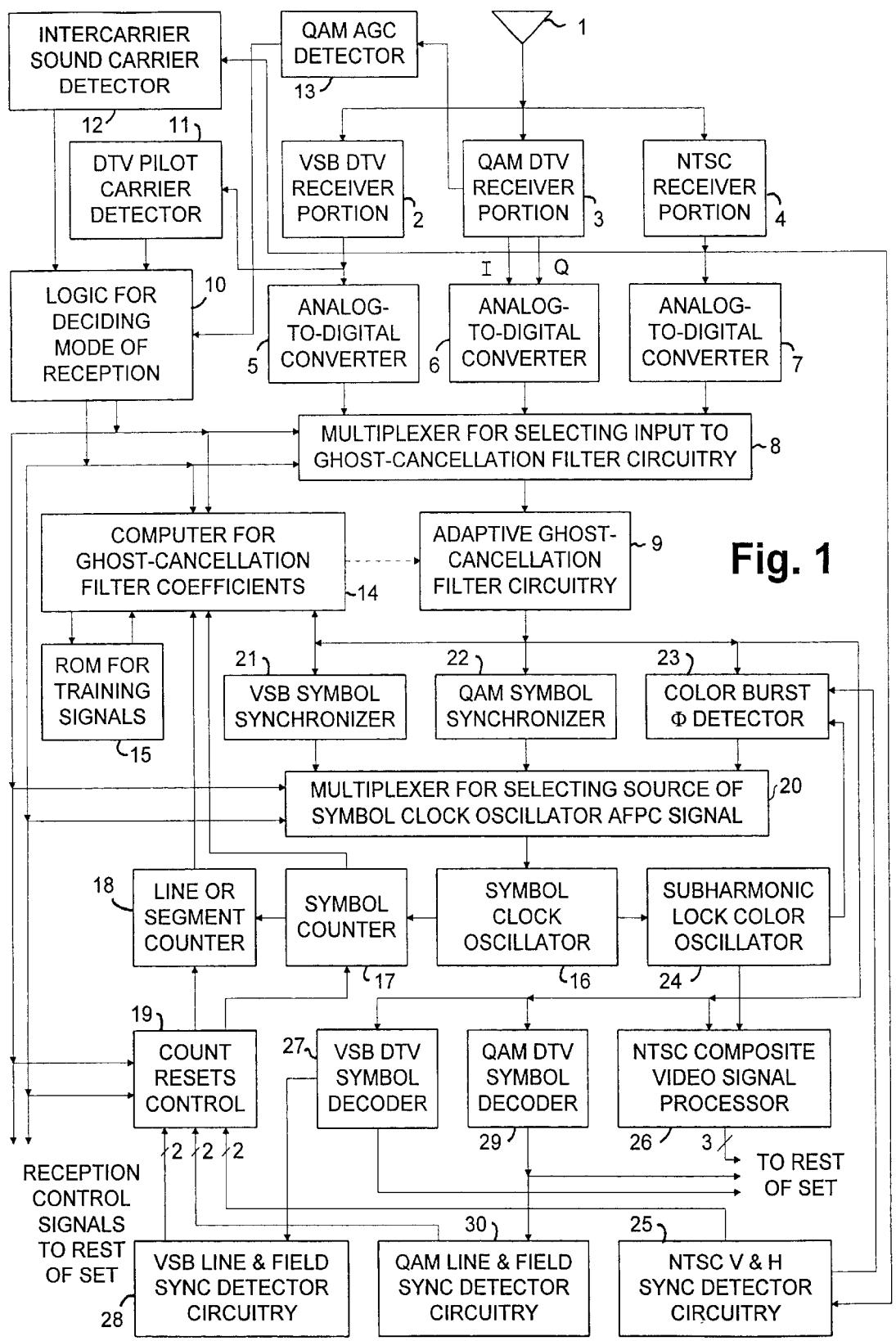
FIG. 1 is a block schematic diagram of portions of television signal reception apparatus for receiving NTSC analog television signals, VSB DTV signals as used in over-the-air terrestrial broadcasting and QAM DTV signals as used in cablecasting and direct satellite broadcasting, which portions include in accordance with the invention adaptive ghost-cancellation filter circuitry for use in the reception of any of these signals.

In FIG. 1 antenna 1 represents all sources of radio-frequency television signals to television signal reception apparatus comprising a VSB DTV receiver portion 2, a QAM DTV receiver portion 3, and an NTSC receiver portion 4. By way of examples, this TV signal reception apparatus may be included in a television set with a viewing screen and apparatus responsive to received baseband signals for creating images on the viewscreen, or this television signal reception apparatus may be included in a digital video recording apparatus. These receiver portions 2–4 preferably share a first mixer and may share intermediate-frequency amplifier circuitry and possibly a further mixer. Various arrangements of this type are described by A. L. R. Limberg in U.S. patent application Ser. No. 08/820,193 filed Mar. 19, 1997 and entitled "DIGITAL-AND-ANALOG-TV-SIGNAL RECEIVERS, EACH WITH SINGLE FIRST DETECTOR AND SHARED HIGH-BAND I-F AMPLIFICATION"; in U.S. patent application Ser. No. 08/825,711 filed Mar. 19 1997 and entitled "RADIO RECEIVER DETECTING DIGITAL AND ANALOG TELEVISION RADIO-FREQUENCY SIGNALS WITH SINGLE FIRST DETECTOR"; and in a similarly titled U.S. patent application Ser. No. 09/003,513 filed Jan. 6, 1998.

In FIG. 1 the VSB DTV receiver portion 2, the QAM DTV receiver portion 3, and the NTSC receiver portion 4 supply baseband signals to analog-to-digital converters (ADCs) 5, 6 and 7, respectively, but in practice digitization may be done before baseband detection. U.S. Pat. No. 5,479,449 entitled "DIGITAL VSB DETECTOR WITH BANDPASS PHASE TRACKER, AS FOR INCLUSION IN AN HDTV RECEIVER", which issued Dec. 26, 1995 to C. B. Patel and A. L. R. Limberg, describes a triple-conversion TV receiver for VSB DTV signals in which receiver final intermediate-frequency signals are digitized and the resulting digital IF signals are synchrodyned to baseband in the digital regime. Digitization of final intermediate-frequency signals and then synchrodyning them to baseband in the digital regime is also practical for QAM DTV signals, as described in U.S. Pat. No. 5,506,636 entitled "HDTV SIGNAL RECEIVER WITH IMAGINARY-SAMPLE-PRESENCE DETECTOR FOR QAM/VSB MODE SELECTION" and issued Apr. 9, 1996 to C. B. Patel and A. L. R. Limberg. Digitization of either VSB or QAM DTV final intermediate-frequency signals and then synchrodyning them to baseband in the digital regime is further described in U.S. Pat. No. 5,715,012 issued to C. B. Patel and A. L. R. Limberg Feb. 3,1998 and entitled "RADIO RECEIVERS FOR RECEIVING BOTH VSB AND QAM DIGITAL HDTV SIGNALS". Digitization of either VSB or QAM DTV final intermediate-frequency signals and then synchrodyning them to baseband in the digital regime is still further described in U.S. patent application Ser. No. 08/773,949 filed by C. B. Patel and A. L. R. Limberg Dec. 26, 1996 and entitled "RADIO RECEIVERS FOR RECEIVING BOTH VSB AND QAM DIGITAL HDTV SIGNALS" as a continuation-in-part of U.S. patent applications Ser. Nos. 08/266,753 and 08/614,471.

A concern in the design of the NTSC receiver portion 4 is the suppression of co-channel interference from VSB DTV signals. So, the NTSC receiver portion 4 preferably is of a form like that described in detail by A. L. R. Limberg in U.S. Pat. No. 5,786,870 issued Jul. 28, 1998, entitled "NTSC VIDEO SIGNAL RECEIVERS WITH REDUCED SENSITIVITY TO INTERFERENCE FROM CO-CHANNEL DIGITAL TELEVISION SIGNALS" and incorporated herein by reference.

The digital baseband response from the QAM DTV receiver portion is formatted to time-interleave in-phase and quadrature-phase samples in one of the input signals to a multiplexer 8. In the FIG. 1 DTV receiver this interleaving is done incidentally to analog-to-digital conversion of the analog response from the QAM DTV receiver portion 3. The ADC 6 is arranged to select its input samples alternately from the analog in-phase response of the QAM DTV receiver portion 3 and from the analog quadrature-phase response of the QAM DTV receiver portion 3.

The digital baseband responses from the VSB DTV receiver portion, the QAM DTV receiver portion, and the NTSC receiver portion are applied as input signals to the multiplexer 8, which selects one of these digital baseband responses as input signal for adaptive ghost-cancellation filter circuitry 9. The adaptive ghost-cancellation filter circuitry 9 is used to filter response from a selected one of the respective digitized baseband responses of the VSB DTV receiver portion 2, the QAM DTV receiver portion 3, and the NTSC receiver portion 4. The multiplexer 8 makes this selection responsive to selection signals supplied by logic circuitry 10 used for deciding the current mode of reception from the received signal. The multiplexer 8 may comprise three banks of tri-states. When the logic circuitry 10 supplies a signal indicating the reception of a VSB DTV signal, a first of these banks of tri-states supplies the bits of the digital response of ADC 5 at low source impedances to the input port of the ghost-cancellation filter circuitry 9 as applied input signal thereto. When the logic circuitry 10 supplies a signal indicating the reception of a QAM DTV signal, a second bank of these tri-states supplies the bits of the digital response of ADC 6 at low source impedances to the input port of the ghost-cancellation filter circuitry 9. When the logic circuitry 10 supplies a signal indicating the reception of an NTSC analog TV signal, a third bank of these tri-states supplies the bits of the digital response of ADC 7 at low source impedances to the input port of the ghost-cancellation filter circuitry 9 as applied input signal thereto.

If a VSB DTV pilot signal accompanies the signal received by the FIG. 1 portion of the TV set, a DTV pilot carrier detector 11 associated with the VSB DTV receiver portion 2 responds to this condition to indicate the reception of a VSB DTV signal. The DTV pilot carrier detector 11 can be one which responds to the baseband response of the VSB DTV receiver portion 2 exhibiting a direct offset owing to synchronous detection of the pilot carrier accompanying the VSB DTV signal, for example. The logic circuitry 10 responds to this indication for conditioning the first bank of tri-states in the multiplexer 8 to apply the bits of the digital response of ADC 7 at low source impedances to the input port of the ghost-cancellation filter circuitry 9.

If an NTSC signal of substantial strength is received by the FIG. 1 portion of the TV set, an intercarrier sound carrier detector 12 associated with the NTSC receiver portion 4 responds to pronounced 4.5 MHz intercarrier generated responsive to this condition for indicating the reception of a NTSC analog TV signal. The logic circuitry 10 responds to this indication for conditioning the third bank of tri-states in the multiplexer 8 to apply the bits of the digital response of ADC 7 at low source impedances to the input port of the ghost-cancellation filter circuitry 9.

The FIG. 1 portion of the TV set is constructed so that if a QAM DTV signal of sufficient strength to be useful is received, a threshold detector 13 will respond to the development of an automatic gain control (AGC) signal in the QAM DTV receiver portion 3 of the TV set shown in part in FIG. 1. If there are no indications of VSB DTV signal reception or of NTSC analog TV signal reception from the detectors 11 and 12, but the receiver exhibits automatic gain control responsive to QAM signals being received, the logic circuitry 10 presumes that QAM DTV reception takes place and conditions the second bank of tri-states in the multiplexer 8 to apply the bits of the digital response of ADC 6 at low source impedances to the input port of the ghost-cancellation filter circuitry 9.

If the receiver does not exhibit automatic gain control or AGC responsive to QAM signals being received, the logic circuitry 10 presumes that no useful signal is being received and does not condition any of the first, second and third banks of tri-states in the multiplexer 8 to apply bits from low source impedances to the input port of the ghost-cancellation filter circuitry 9. The input port of the ghost-cancellation filter circuitry 9 can be arranged to have a null input signal during such condition.

The output port of the ghost-cancellation filter circuitry 9 supplies signal to a computer 14 used for calculating weighting coefficients for the component digital filters in the circuitry 9. As will be described in greater detail further on in this specification, during the reception of VSB DTV signal and during the reception of NTSC analog TV signal, the computer 14 will select portions of the received signal containing a ghost-cancellation reference signal on which to base calculations of initial weighting coefficients for the component digital filters in the circuitry 9. A read-only memory (ROM) 15 is associated with the computer for storing a priori knowledge of the preferred form(s) for the selected portions of the received signal as they would be were they to be received without attending ghosts. At the time of filing this application the ghost-cancellation reference signals for NTSC analog TV and for ATSC DTV differ, but in accordance with an aspect of the invention it is desirable for the ghost-cancellation reference signals for NTSC analog TV and for ATSC DTV to resemble each other so that the ROM 15 can be constructed without need for as much storage capability.

A sampling clock generator 16 generates the sampling clock signals used by the ADCs 5, 6 and 7. The rate of the sampling clock signals is preferably a multiple of the symbol rate for DTV signals, with the multiple preferably being an integral power of two. This facilitates a symbol counter 17 counting the sampling clock signals to derive a count of the number of symbols per line—that is, the number of symbols per data segment in the case of DTV signals and the arbitrary number of symbols per horizontal scan line in the case of analog TV signals. The count of the number of symbols per line is reset on the next sampling clock signal after a full count of the number of symbols per horizontal scan line is reached. A scan line or data segment counter 18 responds to full count indications from the symbol counter 17 to count the number of data segments per data field in the case of DTV signals and the number of horizontal scan lines per image field in the case of analog TV signals. This count is reset after symbol counter 17 reaches a full count of the number of symbols per horizontal scan line after the counter 18 reaches a full count of the number of data segments per data field in the case of DTV signals and the number of horizontal scan lines per image field in the case of analog TV signals. The computer 14 responds to a prescribed line count from the counter 18 to read from the ROM 15 using the symbol count from the symbol counter 17 as read addressing. A count-resets controller 19 determines for the type of TV signal currently being received what the full counts shall be for the counters 17 and 18; the count-resets controller 19 also determines the correct phasings of the symbol count and line count the counters 17 and 18 respectively provide. These counts are used by the computer 14 to govern its selection of the portions of the received signal containing GCR signal on which to base calculations of weighting coefficients for the component digital filters in the circuitry 9.

The sampling clock generator 16 contains a master clock oscillator receiving frequency and phase control (AFPC) signal from the output port of a multiplexer 20 which selects that AFPC signal from an appropriate source for the type of signal currently being received. The multiplexer 20 makes this selection responsive to the selection signals supplied by logic circuitry 10. The output port of the ghost-cancellation filter circuitry 9 supplies signal to a VSB symbol synchronizer 21 supplying a first source of AFPC signal to a first input port of the multiplexer 20, to a QAM symbol synchronizer 22 supplying a second source of AFPC signal to a second input port of the multiplexer 20, and to a color burst phase detector 23 supplying a third source of AFPC signal to a first input port of the multiplexer 20.

A local color oscillator 24 supplies the color burst phase detector 23 with color subcarrier for synchronously detecting gated color burst. The local color oscillator 24 is locked to a subharmonic of the oscillations of the master clock oscillator in the sampling clock generator 16. This can be accomplished by detecting zero crossings of the oscillations of the master clock oscillator, counting the detected zero crossings in a binary counter, and using the square wave generated as the most significant bit of the count to phase-lock the color oscillator 24. Phase locking of the color oscillator 24 can be done using injection lock or quadricorrelation procedures. NTSC vertical and horizontal sync detection circuitry 25 responds to baseband composite video signal from the NTSC receiver portion 4 of the television receiver apparatus for detecting the occurrences of horizontal sync pulses and field retrace times. These detection results are supplied to the count resets controller 19 and, when the logic circuitry 10 supplies the count resets controller 19 a signal indicating the reception of an analog TV signal, the controller 19 is conditioned to use these detection results for determining when the counters 17 and 18 are to be reset to initial count conditions. This phases the symbol and sync counts so the computer 14 can at appropriate times read from the ROM 15 a ghost-free ghost-cancellation reference signal for analog TV. The output port of the ghost-cancellation filter circuitry 9 supplies input signal to an NTSC composite video signal processor 26, which generates color signals for application to the remainder of the television receiver apparatus.

When the logic circuitry 10 supplies a signal indicating the reception of a VSB DTV signal, the multiplexer 20 is conditioned to supply the master oscillator in the sampling clock generator with AFPC signal from the VSB symbol synchronizer 21. The VSB symbol synchronizer 21 preferably includes a filter for selecting 5.38 MHz half-symbol-rate components from the ghost-cancellation filter circuitry 9 response and circuitry for doubling or quadrupling the selected half-symbol-rate component for comparison with frequency-divided oscillations from the master clock oscillator to generate AFPC signal for the master clock oscillator. When the logic circuitry 10 supplies a signal indicating the reception of a QAM DTV signal, the multiplexer 20 is conditioned to supply the master oscillator in the sampling clock generator with AFPC signal from the QAM symbol synchronizer 22. The QAM symbol synchronizer 21 preferably includes a filter for selecting 2.39 MHz half-symbol-rate components from the ghost-cancellation filter circuitry 9 response and circuitry for doubling or quadrupling the selected half-symbol-rate component for comparison with frequency-divided oscillations from the master clock oscillator to generate AFPC signal for the master clock oscillator. When the logic circuitry 10 supplies a signal indicating the reception of an NTSC analog TV signal, the multiplexer 20 is conditioned to supply the master oscillator in the sampling clock generator with AFPC signal from the color burst phase detector 21.

The output port of the ghost-cancellation filter circuitry 9 supplies input signal to a VSB DTV symbol decoder 27, which generates a binary code stream for application to the remainder of the television receiver apparatus. The output port of the ghost-cancellation filter circuitry 9 also supplies input signal to circuitry 28 for detecting the occurrences of line sync codes and field sync codes. These detection results are supplied to the count resets controller 19 and, when the logic circuitry 10 supplies the count resets controller 19 a signal indicating the reception of a VSB DTV signal, the controller 19 is conditioned to use these detection results for determining when the counters 17 and 18 are to be reset to initial count conditions. This phases the symbol and sync counts so the computer 14 can at appropriate times read from the ROM 15 ghost-free ghost-cancellation reference signal for VSB DTV stored in ROM 15.

The output port of the ghost-cancellation filter circuitry 9 supplies input signal to a QAM DTV symbol decoder 29, which generates a binary code stream for application to the remainder of the television receiver apparatus. The output port of the ghost-cancellation filter circuitry 9 supplies input signal to circuitry 30 for detecting the occurrences of line sync codes and field sync codes. These detection results are supplied to the count resets controller 19 and, when the logic circuitry 10 supplies the count resets controller 19 a signal indicating the reception of a QAM DTV signal, the controller 19 is conditioned to use these detection results for determining when the counters 17 and 18 are to be reset to initial count conditions. In case that cablecast standards are developed in which the QAM includes ghost-cancellation reference signal, this will phase the symbol and sync counts so the computer 14 can read from the ROM 15 at appropriate times ghost-free ghost-cancellation reference signal for QAM DTV.

During analog TV reception AGC signal for the NTSC receiver portion 2 can be developed conventionally, in response to peak detection of horizontal sync tips. To forestall AGC lock-out, the NTSC vertical and horizontal synchronization circuitry 25 draws its input signal from the baseband response of the NTSC receiver portion 4 directly as shown in FIG. 1 or, alternatively, from that response as digitized by the ADC 7. During VSB DTV reception AGC signal for the VSB receiver portion 2 is preferably developed from the direct component of the baseband response of the VSB DTV receiver portion 2 arising from the synchronous detection of the pilot carrier, as described by C. B. Patel and A. L. R. Limberg in U.S. Pat. No. 5,636,252 entitled "AUTOMATIC GAIN CONTROL OF RADIO RECEIVER FOR RECEIVING DIGITAL HIGH-DEFINITION TELEVISION SIGNALS" issued Jun. 3, 1997. During QAM DTV reception, AGC signal is preferably developed as described by A. L. R. Limberg in U.S. Pat. No. 5,805,241 issued Sep.

8, 1998, entitled "NOISE-IMMUNE AUTOMATIC GAIN CONTROL FOR QAM RADIO RECEIVERS" and incorporated herein by reference. Alternatively, AGC signal is developed during VSB and/or QAM DTV reception by amplitude detection of modulation peaks.

A number of different arrangements of computer 14 and adaptive ghost-cancellation filter circuitry 9 elements are known to be possible; and the selection of which of these arrangements depends in certain degree upon the ghost-cancellation reference signals that are finally accepted as standard. The ghost-cancellation filter circuitry 9 that is usually preferred cascades an infinite-impulse-response (IIR) digital filter for canceling post-ghosts with substantial delay after a finite-impulse-response (FIR) digital filter for canceling post-ghosts with little delay, canceling pre-ghosts and implementing channel equalization after separately defined ghosts are substantially canceled. The IIR filter typically includes a digital subtractor supplying its difference output signal as a response of the IIR filter, receiving the response of the previous FIR filter as minuend input signal, and receiving as subtrahend input signal the IIR filter response via a recursive feedback path that includes a component FIR filter. This component FIR filter has many zero weighting coefficients in its kernel, which lends it to being designed to have a specialized construction using programmable bulk delay.

Ideally, when DTV signals are being received, the IIR filter response will switch between certain well-defined signal levels associated with respective symbol codes. The IIR filter response can be compared with that response as quantized to ones of these well-defined signal levels, for generating error signals to support decision-feedback equalization (DFE) methods of adjusting the coefficients in the kernels of the adaptive ghost-cancellation filter circuitry 9. As long as QAM DTV signals are transmitted without GCR signals, DFE methods have to be used when receiving QAM DTV signals. So-called "blind" equalization, which does not rely on a priori knowledge of the transmission channel has to be used for initial adjustment of the weighting coefficients of the ghost-cancellation filter circuitry 9 when a QAM DTV channel is first tuned to. Blind equalization is subject to stalling when the gradient-following procedure used for converging the ghost-cancellation filter circuitry 9 reach localized false minima called "saddlepoints" rather than the ultimate minimum the procedure is supposed to reach. Blind equalization is often a slow procedure when the transmission channel is badly ghosted as it is apt to be when receiving terrestrial over-the-air broadcasts. When VSB DTV signals are received, blind equalization is therefore eschewed in favor of initializing the filter coefficients of the ghost-cancellation filter circuitry 9 based on a training signal or ghost-cancellation (GCR) signal. After such initialization, DFE methods are advantageously used for adjusting the filter coefficients of the ghost-cancellation filter circuitry 9 so as to track changes in multipath reception conditions.

Decision-feedback equalization methods using a continuous least-mean-squares (LMS) weighting-coefficient-error minimization algorithm, as modified to facilitate calculation in substantially real time, are described by A. L. R. Limberg in U.S. patent application Ser. No. 08/832,674 filed Apr. 8, 1997 and entitled "DYNAMICALLY ADAPTIVE EQUALIZER SYSTEM AND METHOD". U.S. Pat. No. 5,648,987 issued Jul. 15, 1997 to J. Yang, C. B. Patel, T. Liu and A. L. R. Limberg and entitled "RAPID-UPDATE ADAPTIVE CHANNEL-EQUALIZATION FILTERING FOR DIGITAL RADIO RECEIVERS, SUCH AS HDTV RECEIVERS" describes preferred DFE methods employing the block-LMS weighting-coefficient-error minimization algorithm method, as modified to facilitate calculation in substantially real time. C. M. Zhao, X. Y. Hu and X. H. Yu indicate in their September 1998 paper "Block Sequential Least Squares Decision Feedback Equalization Algorithm with Application to Terrestrial HDTV Transmission" appearing in IEEE Transactions on Broadcasting, Vol. 44, No. 3, that using block-sequential LMS optimization procedures rather than continuous LMS optimization procedures permits a bit error rate of $3 \times 10^{-9}$ to be achieved with signals having 3.5 dB poorer signal-to-noise ratio.

It is customary to include the quantizer in the recursive feedback path of the IIR filter when DTV signals are being received and decision-feedback methods are used for adjusting the coefficients of the adaptive ghost-cancellation filter circuitry 9. NTSC analog television signals do not switch between certain well-defined signal levels and so do not lend themselves to decision-feedback methods in which the IIR filter response is compared with that response as quantized to ones of these well-defined signal levels. Any quantizer included in the recursive feedback path of the IIR filter during DTV reception is excluded from that path when NTSC analog television signals are being received.

The Bessel chirp that is the current de facto standard GCR signal in NTSC analog TV can be used for adjusting the filter coefficients of the ghost-cancellation filter circuitry 9. This requires the computer 14 to be capable of calculating weighting coefficients for the adaptive ghost-cancellation filter circuitry 9 by steps of performing discrete Fourier transform (DFT) analysis of the filter circuitry 9 response to the Bessel function, characterizing the channel by dividing the elements of the DFT response by corresponding elements of the DFT of the ghost-free Bessel chirp as subjected to lowpass filtering descriptive of ideal channel characteristics, and complementing the DFT characterizing the channel to make a current determination of the weighting coefficients of the filter circuitry 9. After initially determining the weighting coefficients of the filter circuitry 9 when a transmission channel is first received, these coefficients can be updated by comparing the current determinations of these coefficients with previous determinations to generate error signals and then accumulating fractions of these error signals into the previous determinations of these coefficients to accomplish the updating. The reader is referred to U.S. Pat. No. 5,331,416 entitled "METHODS FOR OPERATING GHOST-CANCELATION CIRCUITRY FOR TV RECEIVER OR VIDEO RECORDER", which issued Jul. 19, 1994 to C. B. Patel and J. Yang, for details concerning calculation of the weighting coefficients for the adaptive ghost-cancellation filter circuitry 9 using DFT methods.

The middle PN63 sequence included in DFS signal of the 1995 ATSC DTV standard, as separated by differentially combining corresponding samples of successive field synchronization code sequences, can be the basis for initializing the weighting coefficients of the filter circuitry 9 using DFT methods. Initializing the weighting coefficients this way avoids the problem encountered with DFE methods that the gradient-following procedure used for converging filter coefficients stalls in localized false minima called "saddlepoints" rather than reaching the desired real minimum. After initializing the weighting coefficients of the filter circuitry 9 using DFT methods it can be advantageous to switch over to using DFE methods to reduce any errors that thereafter occur in weighting coefficients, since DFE methods tend better to follow rapidly varying ghosting conditions (e.g., aircraft flutter).

The inventors advocate the use of similar GCR signals in NTSC analog TV transmissions, in ATSC DTV transmissions, and in QAM TV transmissions. Such similar GCR signals can be based on precepts contained in U.S. patent application Ser. No. 08/158,299 entitled "GHOST-CANCELATION REFERENCE SIGNAL WITH BESSEL CHIRPS & PN SEQUENCES, & TV RECEIVER USING SUCH SIGNAL" filed Nov. 29, 1993 by C. B. Patel and J. Yang as a continuation-in-part of U.S. patent application Ser. No. 07/872,077 filed Apr. 22, 1992. A ghost-cancellation reference signal is denominated a "composite ghost-cancellation reference signal" if it contains a relatively-long-duration component signal that can be used for detecting ghosts arising from multipaths having relatively-long-duration differential delay and also contains a relatively-short-duration component signal that can be used for detecting ghosts arising from multipaths having relatively-short-duration differential delay, which component signals both appear within a single data segment of a digital television (DTV) signal or within a single horizontal scan line (usually in the vertical retrace interval) of an analog television signal. U.S. patent application Ser. No. 08/158,299 describes composite GCR signals that occur in a single line of each field, each line with composite GCR signal containing a Bessel chirp component of relatively long duration suited for calculation of weighting coefficients of the ghost-cancellation-filter circuitry by DFT methods and a pseudo-noise (PN) sequence component of relatively short duration suited for calculation of weighting coefficients of the ghost-cancellation-filter circuitry by data-directed error minimization methods. The polarities of the Bessel chirp and PN sequence component GCR signals are varied from field to field over a four-field cycle. This is done to facilitate the separation of these component GCR signals from each other, from synchronizing information and from pedestals by linearly combining corresponding elements of the GCR signals presented in each four-field cycle.

U.S. Pat. No. 5,600,380 entitled "GHOST-CANCELATION REFERENCE SIGNAL ACQUISITION CIRCUITRY, AS FOR TV RECEIVER OR VIDEO RECORDER", which issued Feb. 4, 1997 to C. B. Patel and J. Yang, is incorporated herein by reference for its detailed description of circuitry for separating first and second component GCR signals from NTSC signals. This circuitry is readily adapted for separating first and second component GCR signals from ATSC signals.

FIGS. 2A, 2B, 2C and 2D are timing diagrams of composite GCR signals proposed for accompanying ATSC DTV transmissions, the fields of which ATSC DTV transmissions are consecutively numbered modulo-4. These timin, diagrams and those of FIGS. 3 and 4 share a common modular time scale—namely, the time expended since the beginning of a data segment. These composite GCR signals of FIGS. 2A, 2B, 2C and 2D are inserted into the first data segment of each data field. When these baseband signals are recovered in the TV signal reception apparatus, each is superposed on a direct component that arises from the synchronous detection of the pilot carrier of the ATSC broadcast signal.

The GCR signals of FIGS. 2A, 2B, 2C and 2D begin with segment synchronization code groups 31, 41, 51 and 61, respectively, which code groups each consist of four symbols having successive values of +S, −S, −S and +S. The value +S is one level below the maximum positive data excursion, and the value −S is one level above the maximum negative data excursion. The arrows associated with each of the segment synchronization code groups 31, 41, 51 and 61 is indicative of the sense of polarity of that code group relative to the other of these synchronization code groups. The GCR signals of FIGS. 2A, 2B, 2C and 2D end just before precode groups 32, 42, 52 and 62, respectively, which code groups each consist of twelve symbols repeating the last twelve symbols of the preceding data field. The segment synchronization code groups 31, 41, 51 and 61 are followed by respective symbol code gaps 33, 43, 53 and 63 of prescribed duration, which arc free of signal except for the direct component that arises from the synchronous detection of the pilot carrier of the ATSC broadcast signal. The prescribed duration of the symbol code gaps 33, 43, 53 and 63 that is currently preferred corresponds to 257 symbol epochs, which at 92.909 nanoseconds per symbol corresponds to a 23.878 microsecond interval.

First component GCR signals 34, 44, 54 and 64 follow the symbol code gaps 33, 43, 53 and 63. The arrows associated with each of the first component GCR signals 34, 44, 54 and 64 is indicative of the sense of polarity of that signal relative to the other of these first component GCR signals. The first component GCR signals 34, 44, 54 and 64 are PN127 sequences used in the detection of post-ghosts. The first component GCR signals 34, 44, 54 and 64 are positioned to be completed somewhat more than 40 microseconds before the precode groups 32, 42, 52 and 62 occur, to facilitate suppressing post-ghosts up to 40 microseconds after the principal signal. This avoids having to select longer-duration post-ghosts of the first component GCR signals 34, 44, 54 and 64 from background clutter comprising data at the beginning of the next data segment. Accordingly, the kernel of the PN-sequence auto-correlation filter used for post-ghost selection can be of reasonably short length, such as 127 taps, while selection filter response still has sufficient energy to be distinguishable from the background clutter that is likely to be encountered. Deferring PN127 sequences used as the first component GCR signals 34, 44, 54 and 64 for 261 symbol epochs or 24.249 microseconds after the beginning of their respective data segments causes most of the post-ghosts of the data from the preceding data segments to have occurred before the post-ghosts of the first component GCR signals 34, 44, 54 and 64 that are to be detected. This can substantially reduce the background clutter from which the post-ghosts of the first component GCR signals 34, 44, 54 and 64 have to be separated.

Further symbol code gaps 35, 45, 55 and 65 occur immediately after the first component GCR signals 34, 44, 54 and 64, respectively, and immediately before second component GCR signals 36, 46, 56 and 66, respectively. The arrows associated with each of the second component GCR signals 36, 46, 56 and 66 is indicative of the sense of polarity of that signal relative to the other of these second component GCR signals. The second component GCR signals 36, 46, 56 and 66 are PN127 sequences used in the detection of pre-ghosts. The second component GCR signals 36, 46, 56 and 66 are positioned to be completed immediately before the precode groups 32, 42, 52 and 62 occur, to facilitate suppressing pre-ghosts up to 30 microseconds (or more) before the principal signal.

Preferably, the PN127 sequences used in the second component GCR signals 36, 46, 56 and 66 are of different −1 and +1 code patterns than the PN127 sequences used in the first component GCR signals 34, 44, 54 and 64, to facilitate distinguishing pre-ghosts of the second component GCR signals 36, 46, 56 and 66 from post-ghosts of the first component GCR signals 34, 44, 54 and 64. For example, the PN127 sequences used in the second component GCR signals 36, 46, 56 and 66 can have −1 and +1 code patterns that mirror in time the −1 and +1 code patterns of the PN127 sequences used in the first component GCR signals 34, 44, 54 and 64, respectively. The current preference of the inventors is for each of the PN127 sequences in FIGS. 2A, 2B, 2C and 2D to have −1 and +1 values at −S and +S levels, respectively. This provides these sequences with substantial energy to improve the identification of weaker ghosts, while avoiding some of the non-linearities that may be associated with very high or very low levels of modulation.

The fact of the second component GCR signals 36, 46, 56 and 66 being of 127 symbol duration requires that the 24-symbol VSB-mode code be repositioned in the field synchronization code if the VSB-mode code is to be retained. Preferably, rather than the 24-symbol VSB-mode code being inserted into the symbol code gaps 35, 45, 55 and 65, it is inserted at a predetermined position in the symbol code gaps 33, 43, 53 and 63, a position immediately following the 4-symbol data segment synchronization codes being slightly favored.

The sense of polarity of the first component GCR signals is shown in FIGS. 2A, 2B, 2C and 2D as alternating from frame to frame of the ATSC signal, which facilitates frame counting. FIGS. 2A, 2B, 2C and 2D show the sense of polarity of the second component GCR signal in the final field of each ATSC frame being opposite to the sense of polarity of the second component GCR signal in the initial field of that NTSC frame and being the same in sense of polarity as the second component GCR signal in the initial field of the next ATSC frame. The different patterns in which the first component GCR signals and the second component GCR signals change sense of polarity facilitates the separation of each component GCR signal and its accompanying ghosts from the other component GCR signal and its accompanying ghosts, from the data-segment synchronization code and its accompanying ghosts, and from the VSB-mode code and its accompanying ghosts.

Figure 2A:
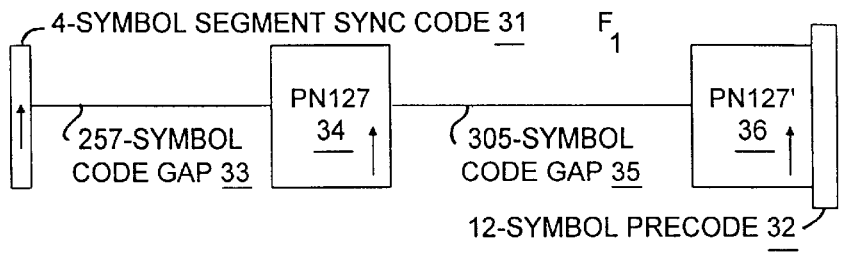
FIGS. 2A, 2B, 2C and 2D are timing diagrams of GCR signals proposed in accordance with an aspect of the invention for accompanying ATSC DTV transmissions, the fields of which ATSC DTV transmissions are consecutively numbered modulo-4.
Figure 2B:
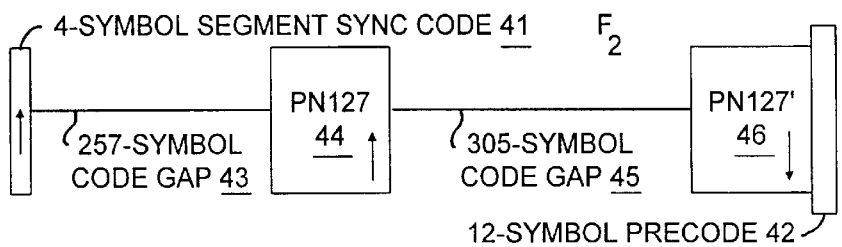
Figure 2C:
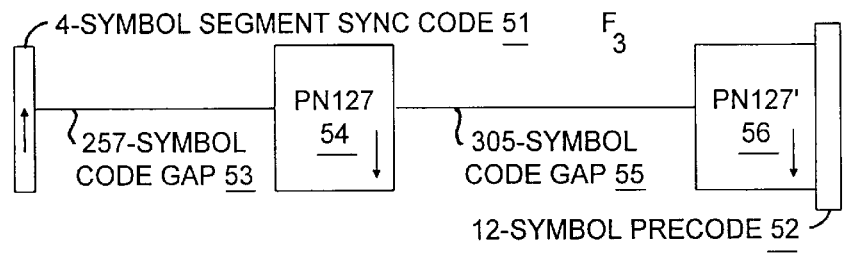
Figure 2D:
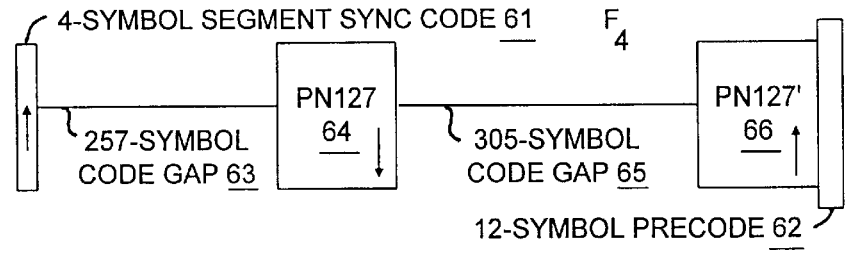
Figure 3:
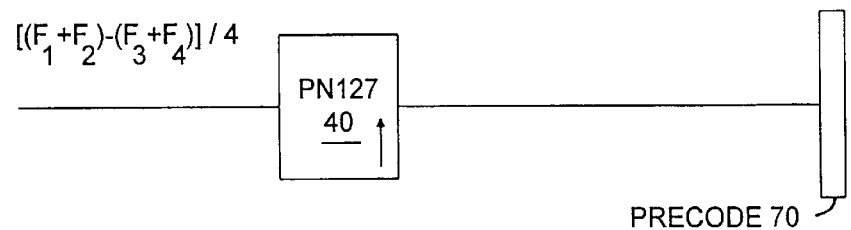
FIG. 3 is a timing diagram of a first component of the GCR signals of FIGS. 2A, 2B, 2C and 2D as separated by linearly combining corresponding samples from these signals in a prescribed manner.

FIG. 3 shows the separated first component GCR signal 40 that results when the sum of the GCR signals of fields F1 and F2 of FIGS. 2A and 2B is differentially combined with the sum of fields F3 and F4 of FIGS. 2C and 2D, the combinings being done on a corresponding samples basis. The data segment synchronization code, the VSB-mode code, and the direct component arising from synchronous detection of pilot carrier are suppressed in this separated first component GCR signal 40, as well as the second component GCR signal being suppressed. A precode 70 formed by the combining of precodes 32, 42, 52 and 62 generally does not average to zero. A separated first component GCR signal similar to that in FIG. 3 also results when the GCR signals from two successive data fields that are in two successive data frames of ATSC DTV signal are differentially combined, assuming that the GCR signals are of the sort shown in FIGS. 2A, 2B, 2C and 2D. A separated first component GCR signal similar to that in FIG. 3 results when corresponding samples of the fields F2 and F3 of FIGS. 2B and 2C, respectively, are differentially combined. A separated first component GCR signal per FIG. 3 also results when corresponding samples of the fields F4 and F1 of FIGS. 2D and 2A, respectively, are differentially combined.

Figure 4:
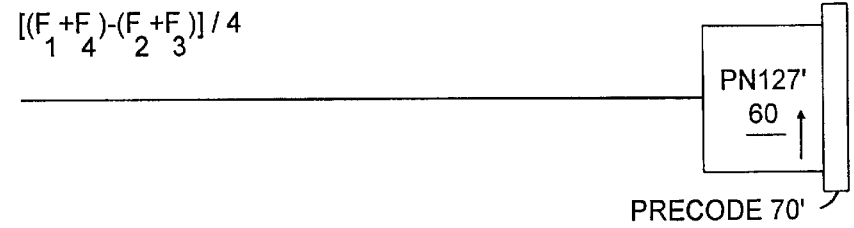
FIG. 4 is a timing diagram of a second component of the GCR signals of FIGS. 2A, 2B, 2C and 2D as separated by linearly combining corresponding samples from these signals in a prescribed manner.

FIG. 4 shows the separated second component GCR signal 60 that results when the sum of the GCR signals of data fields F1 and F4 of FIGS. 2A and 2D is differentially combined with the sum of data fields F2 and F3 of FIGS. 2B and 2C, the combinings being done on a corresponding samples basis. The data segment synchronization code, the VSB-mode code, and the direct component arising from synchronous detection of pilot carrier are suppressed in this separated second component GCR signal, as well as the first component GCR signal being suppressed. A precode 70' formed by the combining of precodes 32, 42, 52 and 62 generally does not average to zero.

FIGS. 5A, 5B, 5C and 5D are timing diagrams of composite GCR signals proposed for accompanying NTSC analog TV transmissions, the fields of which NTSC analog TV transmissions are consecutively numbered modulo-4. These timing diagrams and those of FIGS. 6 and 7 share a common modular time scale—namely, the time expended since the beginning of a horizontal scan line in the vertical blanking interval. These composite GCR signals may be inserted into any one of the $11^{th}$ through $20^{th}$ scan lines of each field, the present preference being to insert them into the $19^{th}$ scan line of each field, numbering the scan lines consecutively with the first line occurring after the close of active scan in the preceding field. The insertion of the composite GCR signals into the $19^{th}$ scan line of each field is presumed in the description which follows.

The GCR signals of FIGS. 5A, 5B, 5C and 5D are preceded by horizontal synchronization pulses 37, 47, 57 and 67, respectively, which pulses are depicted as being negative-going. The horizontal synchronization pulses 37, 47, 57 and 67 are respectively followed during ensuing back-porch intervals by chroma bursts 38, 48, 58 and 68. The plus and minus signs near the chroma bursts 38, 48, 58 and 68 indicate their relative polarities respective to each other, per the NTSC standard. The leading edges of the horizontal synchronization pulses 37, 47, 57 and 67 are considered to be the beginning of the vertical-blanking-interval horizontal scan lines, which lines are each of 63.55 microsecond duration in NTSC standard signals. This 63.55 microsecond duration corresponds to substantially 684 symbol epochs of ATSC DTV signal and approximately 113 of these symbol epochs are taken up by the horizontal synchronization pulse and its flanking porches.

The 571 symbol epoch between each back porch and the ensuing front porch is of sufficient duration (53.05 microseconds) to accommodate a pedestal extending for the 559 symbol epochs taken up by two PN127 sequences separated by a 305-symbol code gap and having 6-symbol-period rise and fall times. In the GCR signals of FIGS. 5A, 5B, 5C and 5D the first component GCR signals 34, 44, 54 and 64 and the second component GCR signals 36, 46, 56 and 66 respectively following them are disposed on pedestals 39, 49, 59 and 69 between the back-porch and front porch intervals and are separated by the symbol code gaps 35, 45, 55 and 65, respectively. The current preference is for the PN sequences accompanying NTSC analog TV signals to have −1 and +1 values at −15 IRE and +95 IRE levels, respectively. This provides these sequences with substantial energy to improve the identification of weaker ghosts, while avoiding some of the non-linearities that may be associated with very high or very low levels of modulation. The pedestals 39, 49, 59 and 69 each have a value of +40 IRE levels and transitions to this level from the porches at 0 IRE levels can be made as rapidly as the 40-IRE-level transitions of horizontal sync pulse edges, which take less than 0.254 microsecond. There are no bandwidth constraints, then, to prevent the pedestal transitions each to be made within six ATSC symbol epochs, or 0.557 microsecond.

Figure 5A:
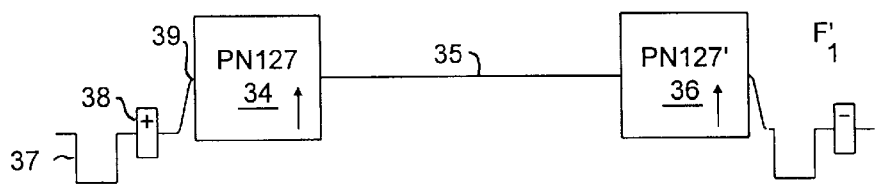
FIGS. 5A, 5B, 5C and 5D are timing diagrams of GCR signals proposed in accordance with an aspect of the invention for accompanying NTSC analog TV transmissions, the fields of which NTSC analog TV transmissions are consecutively numbered modulo-4.
Figure 5B:
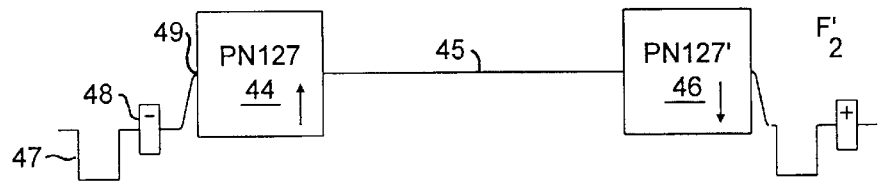
Figure 5C:
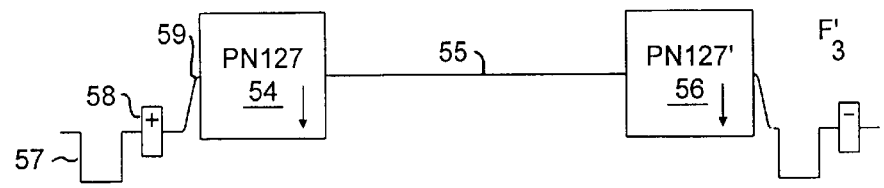
Figure 5D:
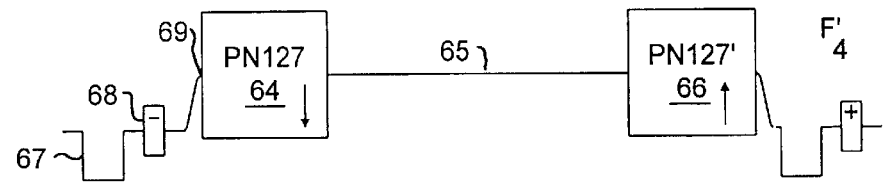
Figure 6:
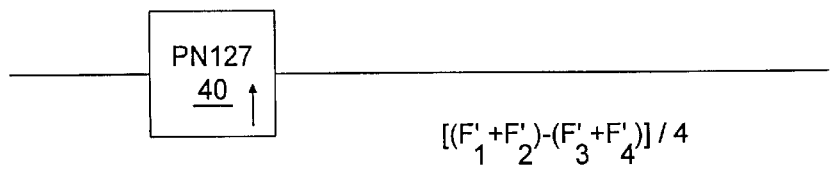
FIG. 6 is a timing diagram of a first component of the GCR signals of FIGS. 5A, 5B, 5C and 5D as separated by linearly combining corresponding samples from these signals in a prescribed manner.

FIG. 6 shows the separated first component GCR signal that results when the GCR signals from two successive fields that are in two successive frames of NTSC analog TV signal are differentially combined, assuming that the GCR signals are of the sort shown in FIGS. 5A, 5B, 5C and 5D. A separated first component GCR signal per FIG. 6 results when the sum of the GCR signals of fields F1' and F2' of FIGS. 5A and 5B is differentially combined with the sum of fields F3' and F4' of FIGS. 5C and 5D, the combinings being done on a corresponding samples basis. The horizontal synchronizing pulses, their porches and the chroma bursts, as well as the second component GCR signal, are suppressed in this separated first component GCR signal. A separated first component GCR signal similar to that in FIG. 6 results when corresponding samples of the fields F2' and F3' of FIGS. 5B and 5C, respectively, are differentially combined. A separated first component GCR signal similar to that in FIG. 6 also results when corresponding samples of the fields F4' and F1' of FIGS. 5D and 5A, respectively, are differentially combined.

Figure 7:
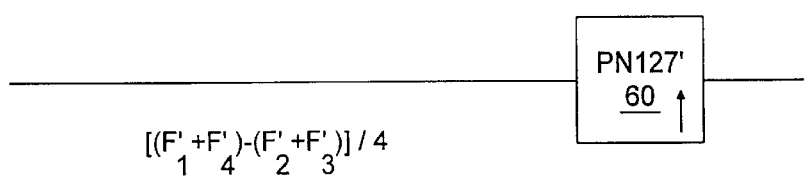
FIG. 7 is a timing diagram of a second component of the GCR signals of FIGS. 5A, 5B, 5C and 5D as separated by linearly combining corresponding samples from these signals in a prescribed manner.

FIG. 7 shows the separated second component GCR signal that results when the sum of the GCR signals of fields F1' and F4' of FIGS. 5A and 5D is differentially combined with the sum of fields F2' and F3' of FIGS. 5B and 5C, the combinings being done on a corresponding samples basis. The horizontal synchronizing pulses, their porches and the chroma bursts, as well as the first component GCR signal, are suppressed in this separated second component GCR signal.

FIGS. 8A, 8B, 8C and 8D show GCR signals that are variants of the GCR signals shown in FIGS. 2A, 2B, 2C and 2D. In FIGS. 8A, 8B, 8C and 8D the sense of polarity of the second component GCR signals, rather than the first component GCR signals, is shown as alternating from frame to frame of ATSC signal. FIGS. 8A, 8B, 8C and 8D show the sense of polarity of the first component GCR signal in the final field of each ATSC frame being opposite to the sense of polarity of the first component GCR signal in the initial field of that ATSC frame and being the same in sense of polarity as the first component GCR signal in the initial field of the next ATSC frame.

Figure 8A:
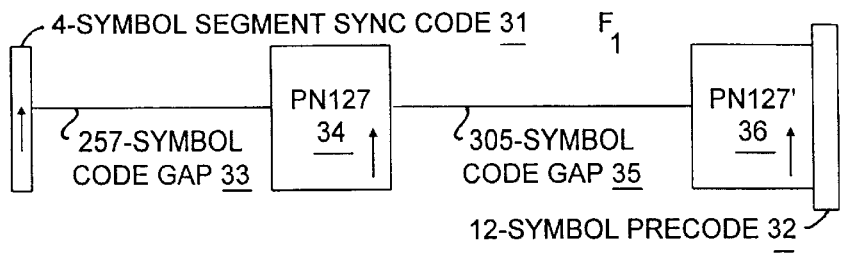
FIGS. 8A, 8B, 8C and 8D are timing diagrams of GCR signals proposed in accordance with an aspect of the invention for accompanying ATSC DTV transmissions, the fields of which ATSC DTV transmissions are consecutively numbered modulo-4.
Figure 8B:
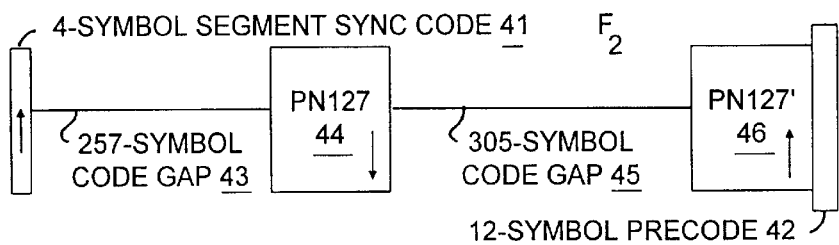
Figure 8C:
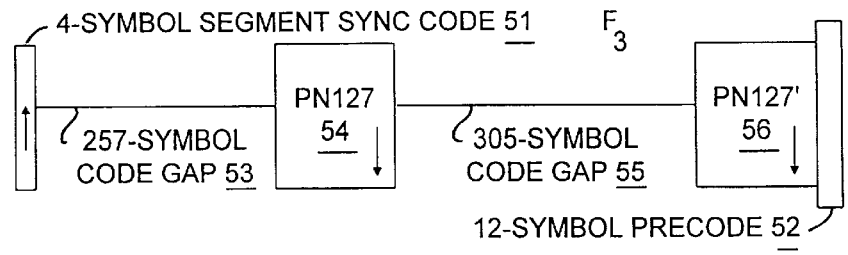
Figure 8D:
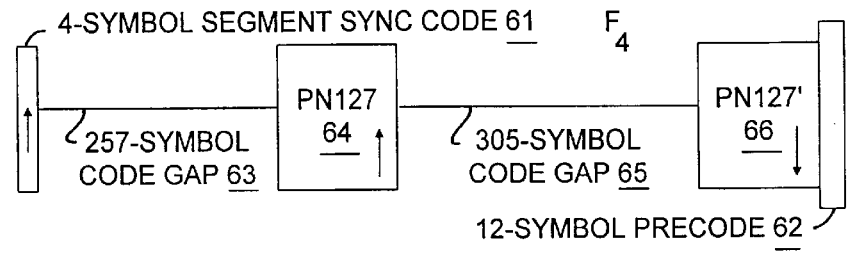
Figure 9:
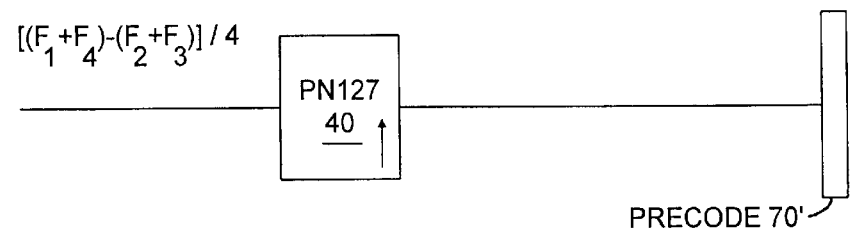
FIG. 9 is a timing diagram of a first component of the GCR signals of FIGS. 8A, 8B, 8C and 8D as separated by linearly combining corresponding samples from these signals in a prescribed manner.

FIG. 9 shows the separated first component GCR signal 40 that results when the sum of the GCR signals of data fields F1 and F4 of FIGS. 8A and 8D is differentially combined with the sum of data fields F2 and F3 of FIGS. 8B and 8C, the combinings being done on a corresponding samples basis. The data segment synchronization code, the VSB-mode code, and the direct component arising from synchronous detection of pilot carrier are suppressed in this separated first component GCR signal, as well as the second component GCR signal being suppressed. The precode 70' formed by the combining of precodes 32, 42, 52 and 62 generally does not average to zero.

Figure 10:
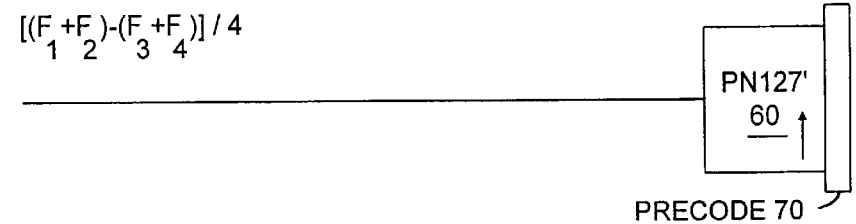
FIG. 10 is a timing diagram of a second component of the GCR signals of FIGS. 8A, 8B, 8C and 8D as separated by linearly combining corresponding samples from these signals in a prescribed manner.
Figure 11A:
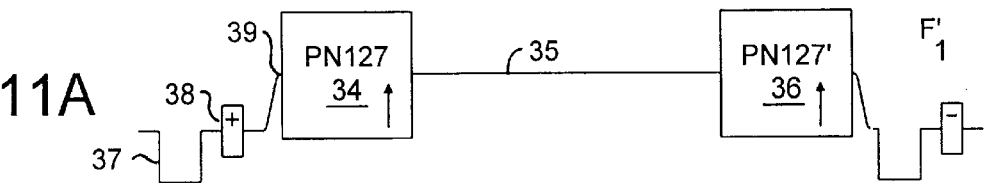
FIGS. 11A, 11B, 11C and 11D are timing diagrams of GCR signals proposed in accordance with an aspect of the invention for accompanying NTSC analog TV transmissions, the fields of which NTSC analog TV transmissions are consecutively numbered modulo-4.
Figure 11B:
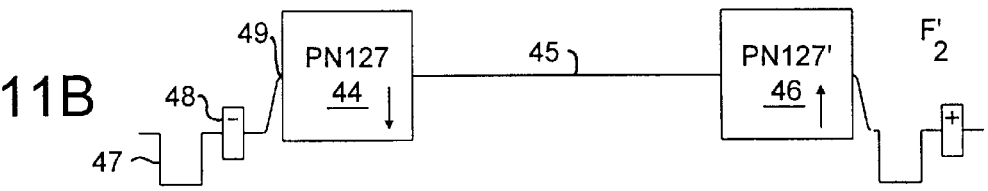
Figure 11C:
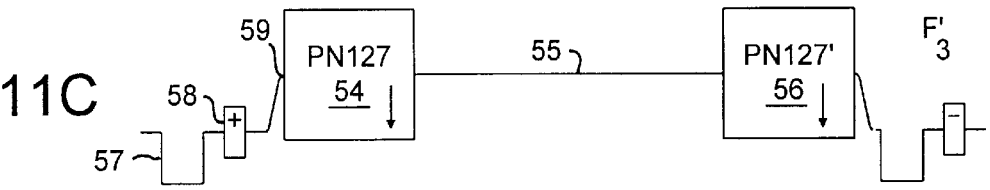
Figure 11D:
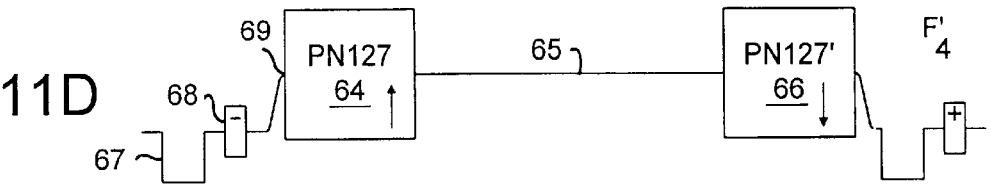

FIG. 10 shows the separated second component GCR signal 60 that results when the sum of the GCR signals of fields F1 and F2 of FIGS. 8A and 8B is differentially combined with the sum of fields F3 and F4 of FIGS. 8C and 8D, the combinings being done on a corresponding samples basis. The data segment synchronization code, the VSB-mode code, and the direct component arising from synchronous detection of pilot carrier are suppressed in this separated second component GCR signal 60, as well as the first component GCR signal being suppressed. The precode 70 formed by the combining of precodes 32, 42, 52 and 62 generally does not average to zero. A separated second component GCR signal similar to that in FIG. 10 also results when the GCR signals from two successive data fields that are in two successive data frames of ATSC DTV signal are differentially combined, assuming that the GCR signals are of the sort shown in FIGS. 8A, 8B, 8C and 8D. A separated second component GCR signal similar to that in FIG. 10 results when corresponding samples of the fields F2 and F3 of FIGS. 8B and 8C, respectively, are differentially combined. A separated first component GCR signal similar to that in FIG. 10 also results when corresponding samples of the fields F4 and F1 of FIGS. 8D and 8A, respectively, are differentially combined.

FIGS. 11A, 11B, 11C and 11D show GCR signals that are variants of the GCR signals shown in FIGS. 5A, 5B, 5C and 5D. In FIGS. 11A, 11B, 11C and 11D the sense of polarity of the second component GCR signals, rather than the first component GCR signals, is shown as alternating from frame to frame of NTSC signal. FIGS. 11A, 11B, 11C and 11D show the sense of polarity of the first component GCR signal in the final field of each NTSC frame being opposite to the sense of polarity of the first component GCR signal in the initial field of that NTSC frame and being the same in sense of polarity as the first component GCR signal in the initial field of the next NTSC frame.

Figure 12:
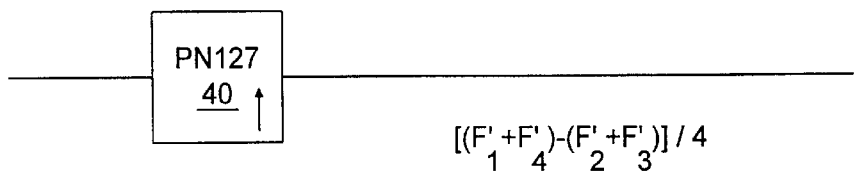
FIG. 12 is a timing diagram of a first component of the GCR signals of FIGS. 11A, 11B, 11C and 11D as separated by linearly combining corresponding samples from these signals in a prescribed manner.

FIG. 12 shows the separated second component GCR signal 40 that results when the sum of the GCR signals of data fields F1' and F4' of FIGS. 8A and 8D is differentially combined with the sum of data fields F2' and F3' of FIGS. 8B and 8C, the combinings being done on a corresponding samples basis. The horizontal synchronizing pulses, their porches and the chroma bursts are suppressed in this separated second component GCR signal, as well as the first component GCR signal being suppressed.

Figure 13:
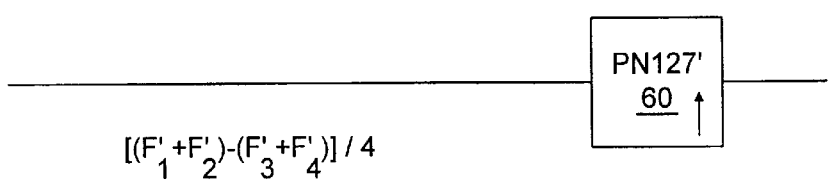
FIG. 13 is a timing diagram of a second component of the GCR signals of FIGS. 11A, 11B, 11C and 11D as separated by linearly combining corresponding samples from these signals in a prescribed manner.

FIG. 13 shows the separated second component GCR signal 60 that results when the sum of the GCR signals of fields F1' and F2' of FIGS. 8A and 8B is differentially combined with the sum of fields F3' and F4' of FIGS. 8C and 8D, the combinings being done on a corresponding samples basis. The horizontal synchronizing pulses, their porches and the chroma bursts are suppressed in this separated second component GCR signal 60, as well as the first component GCR signal being suppressed. A separated second component GCR signal similar to that in FIG. 13 also results when the GCR signals from two successive data fields that are in two successive data frames of NTSC DTV signal are differentially combined, assuming that the GCR signals are of the sort shown in FIGS. 11A, 11B, 11C and 11D. A separated second component GCR signal similar to that in FIG. 13 results when corresponding samples of the fields F2' and F3' of FIGS. 11B and 11C, respectively, are differentially combined. A separated first component GCR signal similar to that in FIG. 13 also results when corresponding samples of the fields F4' and F1' of FIGS. 11D and 11A, respectively, are differentially combined.

The GCR signals shown in the drawing as thusfar described are preferably used to implement calculation of weighting coefficients for the ghost-cancellation filter circuitry 9 in a way that departs from conventional practice. At least initially, the separated second component GCR signal 60 is used for characterizing pre-ghosts in the transmission channel and the separated first component GCR signal 40 is used for characterizing post-ghosts in the transmission channel, rather than using the same GCR signal for characterizing both pre-ghosts and post-ghosts. So there is no longer practical need for GCR signal flanked on both its leading side and its trailing side by ghost-free intervals, in order that background clutter that must be discriminated against in channel characterization is minimal. Instead, a ghost-free interval can be shared by the earlier-in-time first component GCR signal 40 used for characterizing post-ghosts in the transmission channel and the later-in-time second component GCR signal 60 used for characterizing pre-ghosts in the transmission channel. This permits the use of longer PN sequences in the GCR signal to increase spectral energy without having to sacrifice the capability of suppressing weak pre-ghosts up to 30 microseconds earlier than "principal" signal or the capability of suppressing weak post-ghosts up to 40 microseconds later than "principal" signal.

In the linear combining procedure used to separate the later-in-time second component GCR signal 60 from the earlier-in-time first component GCR signal 40, the ghosts of that GCR signal 40 as well as the GCR signal 40 itself are cancelled. So the GCR signal 40 does not affect the calculation of weighting coefficients to suppress pre-ghosts of the second component GCR signal 60, thereby also to suppress the pre-ghosts of all other baseband TV signal components, including the first component GCR signals 34, 44, 54 and 64. Similarly, in the linear combining procedure used to separate the earlier-in-time first component GCR signal 40 from the later-in-time second component GCR signal 60, the ghosts of that GCR signal 60 as well as the GCR signal 60 itself are cancelled. So the GCR signal 60 does not affect the calculation of weighting coefficients to suppress post-ghosts of the first component GCR signal 40, thereby also to suppress the post-ghosts of all other baseband TV signal components, including the second component GCR signals 36, 46, 56 and 66.

As described in U.S. Pat. No. 5,331,416 the adaptive ghost-cancellation-filter circuitry 9 may comprise the cascade connection of an infinite-impulse-response (IIR) digital filter used for suppressing distinct post-ghosts, a finite-impulse-response (FIR) digital filter used for suppressing distinct pre-ghosts, and another finite-impulse-response (FIR) digital filter used for equalization. However, it is preferable in the cascade connection for the FIR digital filter used for suppressing distinct pre-ghosts to precede the IIR digital filter used for suppressing distinct post-ghosts. The filters used for suppressing distinct ghosts substantially displaced from principal signal have sparse kernels comprising mostly zero weighting coefficients and preferably are constructed using programmable bulk delay elements. The FIR filter used for equalization is less apt to have a sparse kernel and preferably follows the filters used for suppressing distinct ghosts in the cascade connection therewith.

The cascaded filters are modeled in computer 14 memory, so that iterative calculations can be performed on the separated component GCR signals recharacterizing the transmission channel for separated component GCR signals as modified by updated weighting coefficients before those weighting coefficients are applied to the adaptive ghost-cancellation-filter circuitry 9 operative on the entire baseband signal. This "duplication" of the adaptive ghost-cancellation-filter circuitry 9 within the computer 14 allows the adjustment of its weighting coefficients to be finalized in a substantially shorter time.

The adjustment of the weighting coefficients of the FIR digital filter used for suppressing distinct pre-ghosts is preferably performed first, proceeding from the separated second component GCR signal 60, and preferably earlier-occurring pre-ghosts are compensated for before later-occurring pre-ghosts are compensated for. The reasons for these preferences are as follow. While initially post-ghosts of the separated first component GCR signal 40 are overlapped by pre-ghosts of non-repetitive information (data in the case of DTV), the separated second component GCR signal 60 has no post-ghosts from any signal overlapping its pre-ghosts. By compensating for earlier-occurring pre-ghosts of the separated second component GCR signal 60 before its later-occurring pre-ghosts, the earlier-occurring pre-ghosts of non-repetitive information following the second component GCR signal are compensated for at the same time. This reduces the background clutter that must be discriminated against when detecting later-occurring pre-ghosts of the separated second component GCR signal 60. Also, compensating for the pre-ghosts of pre-ghosts arising from the FIR filtering is simpler. The suppression of pre-ghosts in the earlier digital FIR filter prevents having to compensate for post-ghosts of the pre-ghosts in the following digital IIR filter used for suppressing post-ghosts. After the updating of the weighting coefficients of the FIR digital filter used for suppressing distinct pre-ghosts is completed, post-ghosts of the separated first component GCR signal 40 are no longer overlapped by pre-ghosts of non-repetitive information.

This facilitates improved characterization of the transmission channel in regard to post-ghosts proceeding from the separated first component GCR signal 40, which characterization is done preparatory to adjustment of the weighting coefficients of the IIR digital filter used for suppressing distinct post-ghosts. The adjustment of the weighting coefficients of the IIR digital filter is preferably performed such that later-occurring post-ghosts are compensated for before earlier-occurring post-ghosts are compensated for. By compensating for later-occurring post-ghosts of the separated first component GCR signal 40 before its earlier-occurring post-ghosts, the later-occurring post-ghosts of non-repetitive information following the second component GCR signal are compensated for at the same time. This reduces the background clutter that must be discriminated against when detecting earlier-occurring post-ghosts of the separated first component GCR signal 40. The weighting coefficients of the IIR digital filter are adjusted to suppress post-ghosts of the post-ghosts and the pre-ghosts less advanced in time, and thereafter the weighting coefficients of the initial FIR digital filter are adjusted to suppress post-ghosts of the pre-ghosts more advanced in time.

The foregoing procedures are iterated until all distinct ghosts are suppressed below a threshold value, and then weighting coefficients for the final FIR filter used for equalization are calculated. This can be done using conventional methods with the first component GCR signal, since short-duration pre-ghosts and post-ghosts are both clear of non-repetitive information (data in DTV).

The GCR signals thusfar described can be modified to include in the symbol gaps 33, 43, 53 and 63 or preferably in the symbol gaps 35, 45, 55 and 65 a third component GCR signal, which alternates its sense of polarity from field to field. Such a third component GCR signal can be useful in a number of ways, particularly because it can have higher wideband spectral energy than the PN127 sequences. The third component GCR signal can be separated from both the first and second component GCR signals and from other prescribed baseband signal components by linearly combining complete GCR signals supplied over a 4-field cycle. This provides a GCR signal useful in cablecast systems and in broadcast studio applications, since weighting coefficients for the de-ghosting filters can be calculated by more straight-forward methods. Weighting coefficients for the final FIR filter used for equalization in a TV receiver can be calculated using the third component GCR signal, rather than the first component GCR signal. Such a third component GCR signal can be separated from one of the first and second component GCR signals and from other prescribed baseband signal components by linearly combining complete GCR signals supplied in two successive fields, so calculation of weighting coefficients to suppress pre-ghosts and calculation of weighting coefficients to suppress post-ghosts can be done every frame, with the respective calculations being carried out in different fields of each frame. This may be advantageous when certain fading conditions are encountered. The third component GCR signal can be a Bessel chirp or a PN sequence, by way of examples.

Figure 14A:
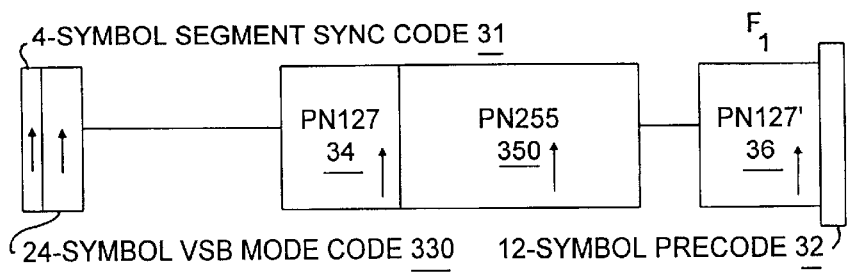
FIGS. 14A, 14B, 14C and 14D are timing diagrams of modifications of the GCR signals shown in FIGS. 2A, 2B, 2C and 2D so as to include respective third components.
Figure 14B:
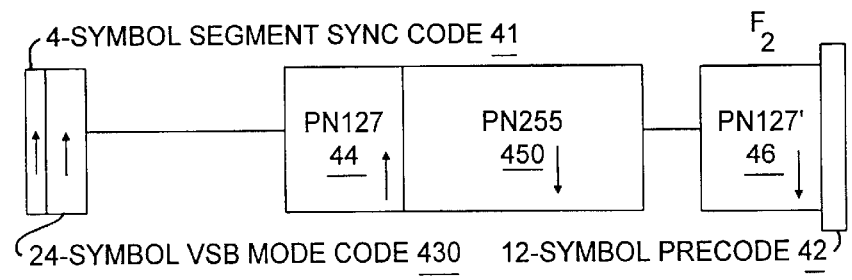
Figure 14C:
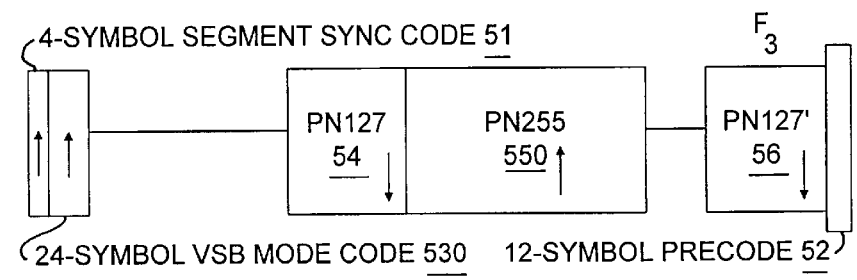
Figure 14D:
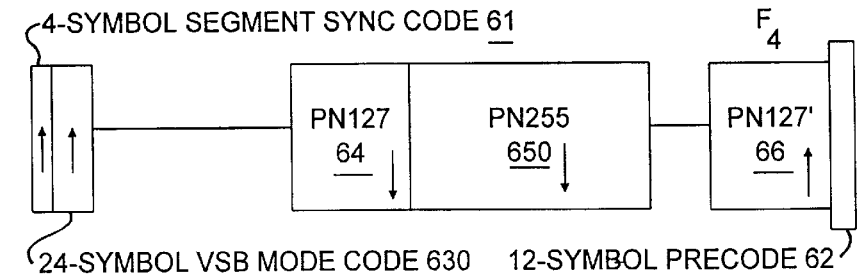
Figure 15:
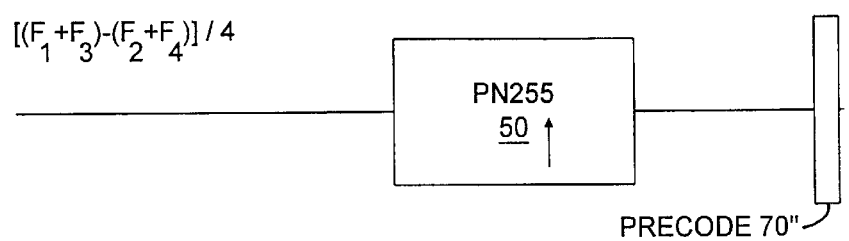
FIG. 15 is a timing diagram of the third component of the GCR signals of FIGS. 2A, 2B, 2C and 2D as separated by linearly combining corresponding samples from these signals in a prescribed manner.

FIGS. 14A, 14B, 14C and 14D show GCR signals that are variants of the GCR signals shown in FIGS. 2A, 2B, 2C and 2D into which third component GCR signals 350, 450, 550 and 650 are inserted into the respective beginnings of the symbol gaps 35, 45, 55 and 65. These third component GCR signals 350, 450, 550 and 650 are 255-sample pseudo-noise sequences each spanning 255 ATSC symbol intervals. These PN255 sequences are shown as having the same −1 and +1 values as the PN127 sequences in the first and second component GCR signals. FIGS. 14A, 14B, 14C and 14D also show 24-symbol VSB-mode codes 330, 430, 530 and 630 are inserted into the respective beginnings of the symbol gaps 33, 43, 53 and 63. FIG. 15 shows the separated third component GCR signal 50 that results when the sum of the GCR signals of fields F1 and F3 of FIGS. 14A and 14C is differentially combined with the sum of fields F2 and F4 of FIGS. 14B and 14D, the combinings being done on a corresponding samples basis. The data segment synchronization code, the VSB-mode code, and the direct component arising from synchronous detection of pilot carrier are suppressed in this separated third component GCR signal 50, as well as the first and second component GCR signals. A precode 70" formed by the combining of precodes 32, 42, 52 and 62 generally does not average to zero. Neither the separation of the first component GCR signal 40 as shown in FIG. 3, nor the separation of the second component GCR signal 60 as shown in FIG. 3, is substantially affected by the third component GCR signals 350, 450, 550 and 650 inserted into the symbol gaps 35, 45, 55 and 65. Also, neither the separation of the first component GCR signal 40 nor the separation of the second component GCR signal 60 is substantially affected by the 24-symbol VSB-mode codes 330, 430, 530 and 630 inserted into the symbol gaps 33, 43, 53 and 63.

FIGS. 16A, 16B, 16C and 16D show GCR signals that are variants of the GCR signals shown in FIGS. 5A, 5B, 5C and 5D into which the third component GCR signals 350, 450, 550 and 650 are inserted into the respective beginnings of the symbol gaps 35, 45, 55 and 65. These third component GCR signals 350, 450, 550 and 650 are 255-sample pseudo-noise sequences each spanning 255 ATSC symbol intervals. These PN255 sequences are shown as having the same −1 and +1 values as the PN127 sequences in the first and second component GCR signals.

Figure 16A:
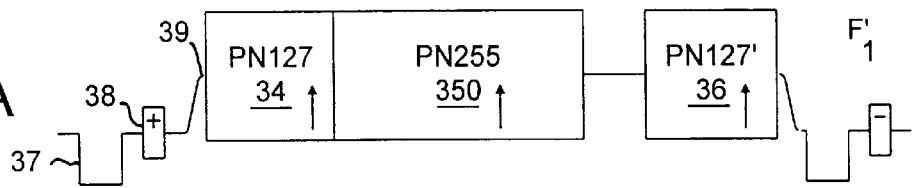
FIGS. 16A, 16B, 16C and 16D are timing diagrams of modifications of the GCR signals shown in FIGS. 5A, 5B, 5C and 5D so as to include respective third components.
Figure 16B:
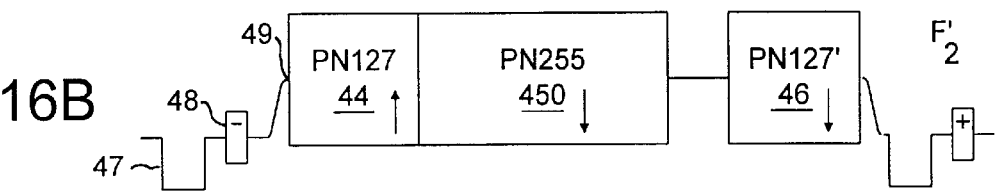
Figure 16C:
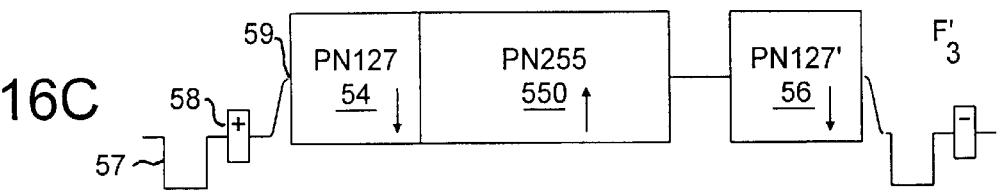
Figure 16D:
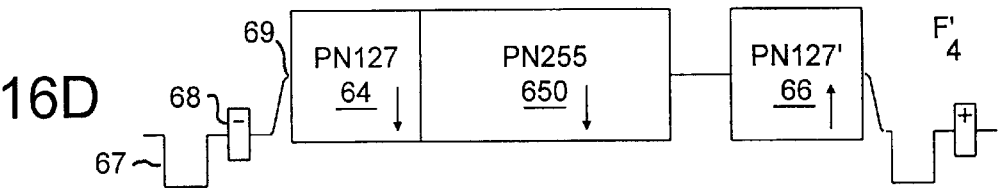
Figure 17:
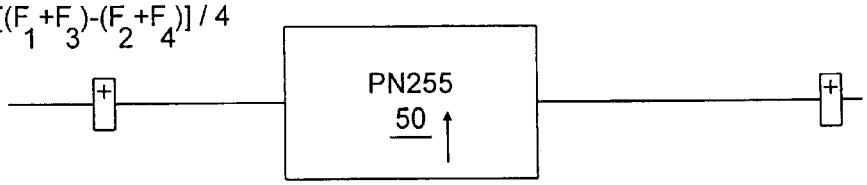
FIG. 17 is a timing diagram of the third component of the GCR signals of FIGS. 16A, 16B, 16C and 16D as separated by linearly combining corresponding samples from these signals in a prescribed manner.

FIG. 17 shows the separated third component GCR signal 50 that results when the sum of the GCR signals of fields F1' and F3' of FIGS. 16A and 16C is differentially combined with the sum of fields F2' and F4' of FIGS. 16B and 16D, the combinings being done on a corresponding samples basis. The horizontal synchronizing pulses, their porches and the GCR pedestals are suppressed in this separated third component GCR signal 50, as well as the first and second component GCR signals, but color bursts are not suppressed. Neither the separation of the first component GCR signal 40 as shown in FIG. 6, nor the separation of the second component GCR signal 60 as shown in FIG. 7, is substantially affected by the third component GCR signals 350, 450, 550 and 650 inserted into the symbol gaps 35, 45, 55 and 65.

FIGS. 18A, 18B, 18C and 18D show GCR signals that are variants of the GCR signals shown in FIGS. 14A, 14B, 14C and 14D. In FIGS. 18A, 18B, 18C and 18D the sense of polarity of the second component GCR signals, rather than the first component GCR signals, is shown as alternating from frame to frame of ATSC signal. FIGS. 18A, 18B, 18C and 18D show the sense of polarity of the first component GCR signal in the final field of each ATSC frame being opposite to the sense of polarity of the first component GCR signal in the initial field of that ATSC frame and being the same in sense of polarity as the first component GCR signal in the initial field of the next NTSC frame.

Figure 18A:
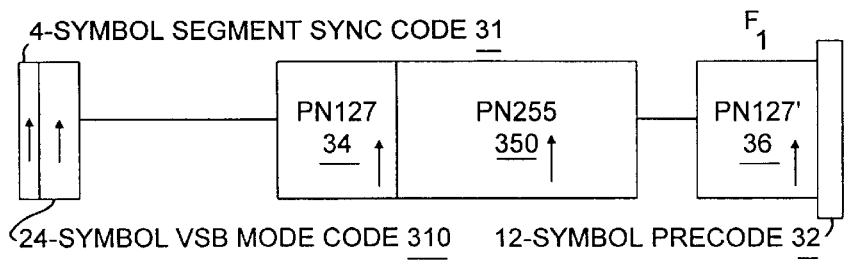
FIGS. 18A, 18B, 18C and 18D are timing diagrams of modifications of the GCR signals shown in FIGS. 8A, 8B, 8C and 8D so as to include respective third components.
Figure 18B:
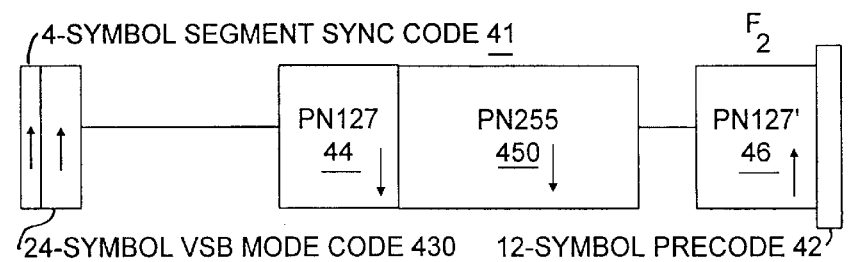
Figure 18C:
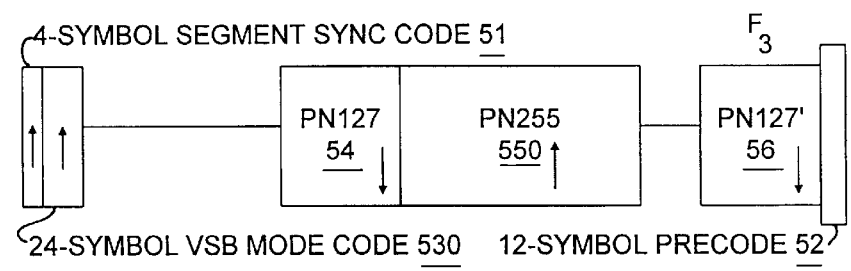
Figure 18D:
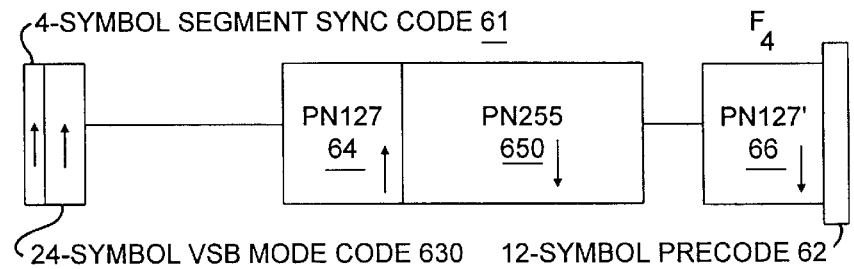
Figure 19:
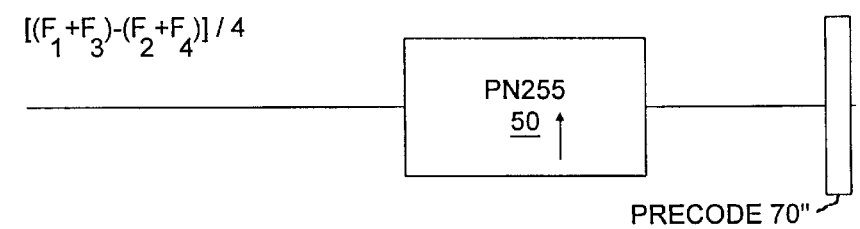
FIG. 19 is a timing diagram of the third component of the GCR signals of FIGS. 18A, 18B, 18C and 18D as separated by linearly combining corresponding samples from these signals in a prescribed manner.

FIG. 19 shows the separated third component GCR signal 50 that results when the sum of the GCR signals of fields F1 and F3 of FIGS. 18A and 18C is differentially combined with the sum of fields F2 and F4 of FIGS. 18B and 18D, the combinings being done on a corresponding samples basis. The data segment synchronization code, the VSB-mode code, and the direct component arising from synchronous detection of pilot carrier are suppressed in this separated third component GCR signal 50, as well as the first and second component GCR signals. The precode 70" formed by the combining of precodes 32, 42, 52 and 62 generally does not average to zero. Neither the separation of the first component GCR signal 40 as shown in FIG. 9, nor the separation of the second component GCR signal 60 as shown in FIG. 10, is substantially affected by the third component GCR signals 350, 450, 550 and 650 inserted into the symbol gaps 35, 45, 55 and 65. Also, neither the separation of the first component GCR signal 40 nor the separation of the second component GCR signal 60 is substantially affected by the 24-symbol VSB-mode codes 330, 430, 530 and 630 inserted into the symbol gaps 33, 43, 53 and 63.

FIGS. 20A, 20B, 20C and 20D show GCR signals that are variants of the GCR signals shown in FIGS. 16A, 16B, 16C and 16D. In FIGS. 20A, 20B, 20C and 20D the sense of polarity of the second component GCR signals, rather than the first component GCR signals, is shown as alternating from frame to frame of NTSC signal. FIGS. 20A, 20B, 20C and 20D show the sense of polarity of the first component GCR signal in the final field of each NTSC frame being opposite to the sense of polarity of the first component GCR signal in the initial field of that NTSC frame and being the same in sense of polarity as the first component GCR signal in the initial field of the next NTSC frame.

Figure 20A:
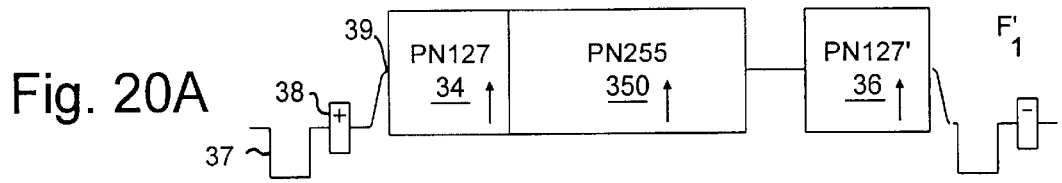
FIGS. 20A, 20B, 20C and 20D are timing diagrams of modifications of the GCR signals shown in FIGS. 11A, 11B, 11C and 11D so as to include respective third components.
Figure 20B:
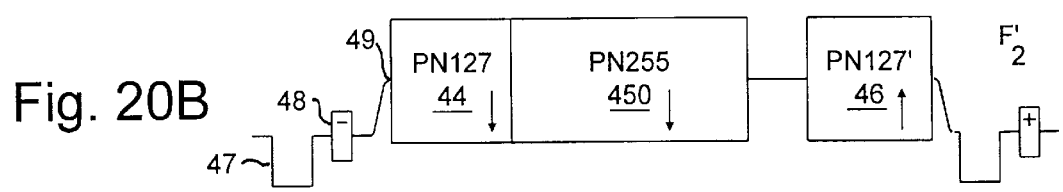
Figure 20C:
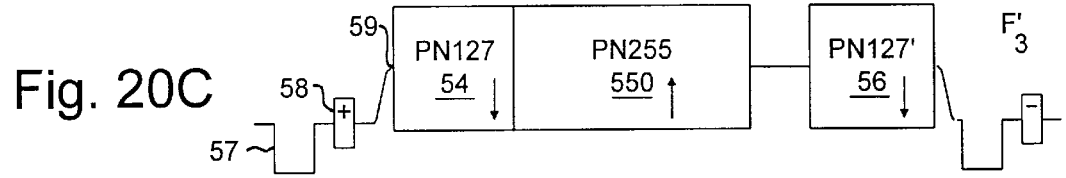
Figure 20D:
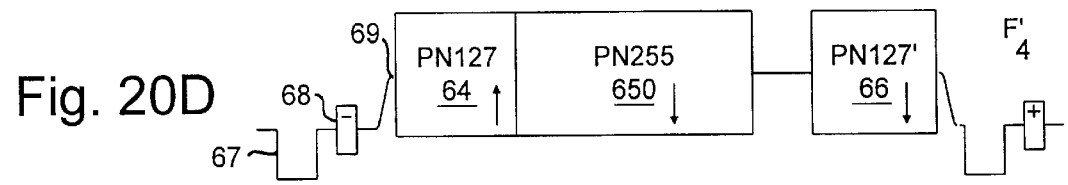
Figure 21:
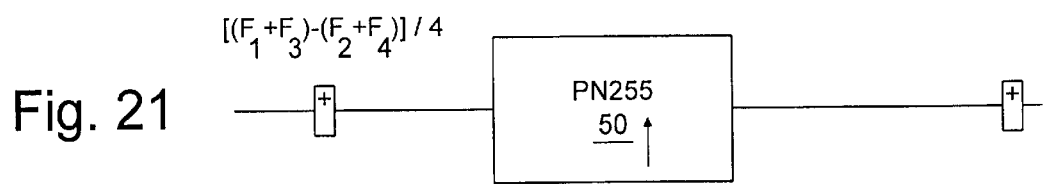
FIG. 21 is a timing diagram of the third component of the GCR signals of FIGS. 20A, 20B, 20C and 20D as separated by linearly combining corresponding samples from these signals in a prescribed manner.

FIG. 21 shows the separated third component GCR signal 50 that results when the sum of the GCR signals of fields F1' and F3' of FIGS. 20A and 20C is differentially combined with the sum of fields F2' and F4' of FIGS. 20B and 20D, the combinings being done on a corresponding samples basis. The horizontal synchronizing pulses, their porches and the GCR pedestals are suppressed in this separated third component GCR signal 50, as well as the first and second component GCR signals, but color bursts are not suppressed. Neither the separation of the first component GCR signal 40 as shown in FIG. 12, nor the separation of the second component GCR signal 60 as shown in FIG. 13, is substantially affected by the third component GCR signals 350, 450, 550 and 650 inserted into the symbol gaps-35, 45, 55 and 65.

The third component GCR signals are preferably inserted into the symbol gaps 35, 45, 55 and 65 rather than into the symbol gaps 33, 43, 53 and 63 so as better to facilitate suppression of pre-ghosts more advanced in time. The third component GCR signals 350, 450, 550 and 650 are preferably inserted into the beginnings of the symbol gaps 35, 45, 55 and 65 to facilitate suppression of longer delayed postghosts. The third component GCR signals can be inserted instead into the symbol gaps 33, 43, 53 and 63 or into later positions in the symbol gaps 35, 45, 55 and 65, however. The 24-symbol VSB-mode codes can be inserted into later positions of the symbol gaps 33, 43, 53 and 63 or into the symbol gaps 35, 45, 55 and 65 so long as the VSB-mode codes do not overlap third component GCR signals. Spaced PN127 sequences were used in the composite GCR signals of FIGS. 2A, 2B, 2C, 2D; 5A, 5B, 5C, 5D; 11A, 11B, 11C, 11D; 14A, 14B, 14C, 14D etc. because of their greater spectral energy than shorter PN sequences, but spaced PN63 sequences could be used instead. Spaced PN255 sequences could also be used, but the correlation filters are more expensive and in ATSC DTV reception data ghosts may increase the energy of the background clutter in which weak ghosts must be discerned. Modifying the composite GCR signals of FIGS. 2A, 2B, 2C, 2D; 5A, 5B, 5C, 5D; 11A, 11B, 11C, 11D; 14A, 14B, 14C, 14D to replace the PN127 sequences in the first component GCR signals 34, 44, 54 and 64 with PN255 sequences starting 128 symbol epochs earlier is also a possibility.

The portions of the symbol gaps 33, 43, 53 and 63 or the symbol gaps 35, 45, 55 and 65 that are unoccupied by component GCR signals or 24-symbol VSB-mode codes are suitable for the insertion of codes that repeat from field to field over the length of a received program. Codes that identify the particular program with regard to a published program listing are useful, for example.

Codes that identify the number of a reception channel and transmission source of the TV signals (including whether the source is a cablecast transmitter or an over-the-air broadcast transmitter) are particularly desirable, by way of further example. These latter codes serve well as addresses for memory that stores previously derived weighting coefficients for the ghost-cancellation-filter circuitry 9. When tuning to a DTV channel that has been previously received, presuming the receiver has not been moved since the last time that channel was received, ghost suppression is likely to be good enough that usable DTV signals can be instantly received. This improves the "feel" of tuning through the VHF band for DTV signals. Where program identification codes are being searched for, the seeking apparatus is less likely to have to wait for channel equalization during points in the search. Where the DTV channel is being used to transmit multiplexed data signals, each data source can be provided a respective GCR signal, and the memory can apply correct weighting coefficients to the ghost-cancellation-filter circuitry 9 for the selected data source.

In the claims which follow the word "said" is used to indicate antecedence rather than the word "the", which is used for other grammatical purposes.

What is claimed is:

1. An electrical signal received by a television signal receiver, which is of a type for receiving digital television signals and has adaptive channel equalization and ghost cancellation filter circuitry that can be trained responsive to composite ghost cancellation reference signals, said electrical signal divided into segments having respective initial synchronizing signal portions, said segments being grouped into fields, most of the segments of each field being available for transmitting television information, with at least one reference-signal segment of each field transmitting one of said composite ghost cancellation reference signals in a final portion thereof, each reference-signal segment including a respective first pseudo-random noise sequence at the beginning of said final portion thereof followed after an intervening time interval by a respective second pseudo-random noise sequence before the finish of said final portion thereof, said composite ghost cancellation reference signal transmitted in each reference-signal segment comprising said respective first and second pseudo-random noise sequences.

2. The electrical signal of claim 1, wherein said respective first and second pseudo-random noise sequences transmitted in each reference-signal segment are orthogonal to each other.

3. The electrical signal of claim 1, wherein said respective first and second pseudo-random noise sequences transmitted in each reference-signal segment have symbol epochs of substantially 93 nanosecond duration.

4. The electrical signal of claim 3, wherein said final portions of said reference-signal segments of each field are of uniform duration shorter than 54 microseconds.

5. The electrical signal of claim 4, wherein said respective first and second pseudo-random noise sequences transmitted in each reference-signal segment are orthogonal to each other.

6. The electrical signal of claim 5, wherein said respective first and second pseudo-random noise sequences transmitted in each reference-signal segment are PN127 sequences.

7. The electrical signal of claim 1, wherein said first and second pseudo-random noise sequences appear in different polarities in different fields for enabling said first and second pseudo-random noise sequences to be separated from each other, by said television signal receiver algebraically combining elements of each reference-signal segment with corresponding elements of at least one other reference-signal segment from another field.

8. The electrical signal of claim 7, wherein said respective first and second pseudo-random noise sequences transmitted in each reference-signal segment are orthogonal to each other.

9. The electrical signal of claim 8, wherein said respective first and second pseudo-random noise sequences transmitted in each reference-signal segment have symbol epochs of substantially 93 nanosecond duration.

10. The electrical signal of claim 9, wherein said final portions of said reference-signal segments of each field are of uniform duration shorter than 54 microseconds.

11. The electrical signal of claim 10, wherein said respective first and second pseudo-random noise sequences in each said reference-signal segment are PN127 sequences.

12. A television receiver designed for receiving the electrical signal of claim 7, for algebraically combining elements of each reference-signal segment with corresponding elements of at least one other reference-signal segment from another field for separating said first and second pseudo-random noise sequences from each other, for utilizing the separated second pseudo-random noise sequences for pre-ghost cancellation, and for utilizing the separated first pseudo-random noise sequences for post-ghost cancellation.

13. The electrical signal of claim 1, wherein said first and second pseudo-random noise sequences appear in different polarities in different fields for enabling said first and second pseudo-random noise sequences to be separated from each other and from a respective intervening sequence of symbols in each of said different fields, by said television signal receiver algebraically combining elements of each reference-signal segment with corresponding elements of at least one other reference-signal segment from another field.

14. The electrical signal of claim 13, wherein said respective intervening sequence of symbols in each said reference-signal segment includes a third pseudo-random noise sequence.

15. The electrical signal of claim 14, wherein the third pseudo-random noise sequence in each said reference-signal segment occurs differs from both of said respective first and second pseudo-random noise sequences in that said reference-signal segment.

16. The electrical signal of claim 15, wherein the respective first and second pseudo-random noise sequences in each said reference-signal segment are PN127 sequences and the respective third pseudo-random noise sequence in each said reference-signal segment is a PN255 sequence.

17. The electrical signal of claim 16, wherein said respective first and second pseudo-random noise sequences transmitted in each reference-signal segment are orthogonal to each other.

18. The electrical signal of claim 13, wherein said respective first and second pseudo-random noise sequences transmitted in each reference-signal segment are orthogonal to each other.

19. A television receiver designed for receiving the electrical signal of claim 13, for algebraically combining elements of each reference-signal segment with corresponding elements of at least one other reference-signal segment from another field for separating said first and second pseudo-random noise sequences from each other, for utilizing the separated second pseudo-random noise sequences for pre-ghost cancellation, and for utilizing the separated first pseudo-random noise sequences for post-ghost cancellation.

20. A television receiver designed for receiving the electrical signal of claim 1, for utilizing the second pseudo-random noise sequences for pre-ghost cancellation, and for utilizing the first pseudo-random noise sequences for post-ghost cancellation.

21. The electrical signal of claim 1, wherein said final portion includes a precode group at the finish of said final portion and said second pseudo-random noise sequence immediately precedes said precode group.

* * * * *